US012183912B2

United States Patent
Shi et al.

(10) Patent No.: US 12,183,912 B2
(45) Date of Patent: Dec. 31, 2024

(54) METHODS AND SYSTEMS FOR DRY SURFACE DOPING OF CATHODE MATERIALS

(71) Applicant: A123 Systems LLC, Novi, MI (US)

(72) Inventors: Yang Shi, Waltham, MA (US); Kitae Kim, Cambridge, MA (US); Lixin Wang, Belmont, MA (US); Yingjie Xing, Watertown, MA (US); Andrew Millonig, Billerica, MA (US); Bryan Kim, Waltham, MA (US); Derek C. Johnson, Fort Collins, CO (US)

(73) Assignee: A123 SYSTEMS LLC, Waltham, MA (US)

(*) Notice: Subject to any disclaimer, the term of this patent is extended or adjusted under 35 U.S.C. 154(b) by 426 days.

(21) Appl. No.: 16/862,237

(22) Filed: Apr. 29, 2020

(65) Prior Publication Data

US 2020/0358076 A1    Nov. 12, 2020

Related U.S. Application Data

(60) Provisional application No. 62/845,835, filed on May 9, 2019.

(51) Int. Cl.
*H01M 4/04* (2006.01)
*H01M 4/52* (2010.01)
(Continued)

(52) U.S. Cl.
CPC ......... *H01M 4/0471* (2013.01); *H01M 4/525* (2013.01); *H01M 10/0525* (2013.01)

(58) Field of Classification Search
None
See application file for complete search history.

(56) References Cited

U.S. PATENT DOCUMENTS

2012/0156566 A1   6/2012 Akalay et al.
2012/0256337 A1* 10/2012 Yokoyama ............ C01G 53/40
                                                          241/3
(Continued)

FOREIGN PATENT DOCUMENTS

CN    107482204 A    12/2017
CN    107579224 A    1/2018
(Continued)

OTHER PUBLICATIONS

Woo, S. et al., "Improvement of electrochemical and thermal properties of Li[Ni0.8Co0.1Mn0.1])2 positive electrode materials by multiple metal (Al, Mg) substitution," Electrochimica Acta, vol. 54, No. 15, Jun. 1, 2009, 6 pages.

(Continued)

*Primary Examiner* — Barbara L Gilliam
*Assistant Examiner* — Angela J Martin
(74) *Attorney, Agent, or Firm* — McCoy Russell LLP

(57) ABSTRACT

A doped cathode material for lithium-ion batteries is disclosed. Methods and systems are further provided for doping a cathode material for use in a lithium-ion battery. In one example, the doping may be a dry surface doping process. In some examples, dopants may stabilize a crystal structure of the cathode material and may result in fewer side reactions with an electrolyte as compared to an undoped cathode material. As such, cycling performance and capacity retention may be improved relative to the undoped cathode material. Further, in some examples, the doped cathode material produced with the dry surface doping process may have improved cycling performance and capacity retention relative to a comparable doped cathode material produced with a wet surface doping process.

17 Claims, 15 Drawing Sheets

(51) Int. Cl.
*H01M 4/525* (2010.01)
*H01M 10/05* (2010.01)
*H01M 10/0525* (2010.01)

(56) References Cited

U.S. PATENT DOCUMENTS

| | | | | |
|---|---|---|---|---|
| 2014/0154581 A1* | 6/2014 | Kawasato | ............ | H01M 4/366 429/231.95 |
| 2017/0069907 A1 | 3/2017 | Zhu et al. | | |
| 2018/0019464 A1* | 1/2018 | Xia | ............... | H01M 4/366 |
| 2018/0034045 A1 | 2/2018 | Xia et al. | | |
| 2018/0062173 A1 | 3/2018 | Jo et al. | | |
| 2018/0226631 A1 | 8/2018 | Paulsen et al. | | |
| 2019/0027750 A1 | 1/2019 | Park et al. | | |
| 2020/0203706 A1* | 6/2020 | Holman | ............ | C01G 53/50 |

FOREIGN PATENT DOCUMENTS

| | | |
|---|---|---|
| EP | 3214672 A1 | 9/2017 |
| EP | 3439081 A1 | 2/2019 |
| WO | 2010150038 A1 | 12/2010 |
| WO | 2015132647 A1 | 9/2015 |
| WO | 2016116862 A1 | 7/2016 |
| WO | 2016116867 A1 | 7/2016 |
| WO | 2017013520 A1 | 1/2017 |
| WO | 2017168274 A1 | 10/2017 |
| WO | 2018143612 A1 | 8/2018 |

OTHER PUBLICATIONS

Jung, S. et al., "Understanding the Degradation Mechanisms of LiNi0.5Co0.2Mn0.3O2 Cathode Material in Lithium Ion Batteries," Advanced Energy Materials, vol. 4, No. 1, Jan. 2014, 7 pages.

Kim, U. et al., "Extending the Battery Life Using an Al-Doped Li[Ni0.76Co0.09Mn0.15]O2 Cathode with Concentration Gradients for Lithium Ion Batteries," ACS Energy Letters, vol. 2, No. 8, Jul. 24, 2017, 7 pages.

You, Y. et al., "Modified High-Nickel Cathodes with Stable Surface Chemistry Against Ambient Air for Lithium-Ion Batteries," Angewandte Chemie, vol. 57, No. 22, Mar. 30, 2018, 6 pages.

Cho, W. et al., "Facile Mn Surface Doping of Ni-Rich Layered Cathode Materials for Lithium Ion Batteries," Applied Materials & Interfaces, vol. 10, No. 45, Oct. 18, 2018, 7 pages.

ISA Korean Intellectual Property Office, International Search Report and Written Opinion Issued in Application No. PCT/US2020/030549, Aug. 12, 2020, WIPO, 12 pages.

Zheng, L. et al., "A high-quality mechanofusion coating for enhancing lithium-ion battery cathode material performance," MRS Communications, vol. 9, No. 1, Mar. 2019, 6 pages.

European Patent Office, Extended European Search Report Issued in Application No. 20802285.5, Jun. 14, 2023, Germany, 8 pages.

* cited by examiner

METHODS AND SYSTEMS FOR DRY SURFACE DOPING OF CATHODE MATERIALS

CROSS REFERENCE TO RELATED APPLICATIONS

The present application claims priority to U.S. Provisional Application No. 62/845,835, entitled "METHODS AND SYSTEMS FOR DRY SURFACE DOPING OF CATHODE MATERIALS," and filed on May 9, 2019. The entire contents of the above-identified application are hereby incorporated by reference for all purposes.

FIELD

The present description relates generally to methods and systems for dry surface doping cathode materials for use in lithium-ion batteries.

BACKGROUND AND SUMMARY

Lithium-ion, or Li-ion, or $Li^+$, batteries offer desirable characteristics, such as high energy density, high power, and long cycle life, resulting in widespread use as secondary cells in portable electronics or electric vehicles, for example.

During charging of a Li-ion battery, a power source may promote movement of Li ions in and out of a crystal structure of a nickel-based cathode material therein. However, during such a delithiation/lithiation, or charge/discharge, process, changes in lattice parameters of the cathode material crystal structure correspondingly lead to lattice contraction and expansion. The accumulated effect of resultant stress and strain leads to formation and growth of cracks in the cathode material. Further, movement of the Li ions from the cathode material may leave nickel (Ni) ions in a highly reactive valence state, resulting in collapse of the cathode material crystal structure. In such delithiated cathodes, Ni ions tend to migrate toward vacant $Li^+$ sites due to similar ionic radii between the two ions (e.g., an ionic radius of $Ni^{2+}$ is about 0.69 Å and an ionic radius of $Li^+$ is about 0.72 Å). As such, spinel or rock salt phases may be formed, blocking transportation of $Li^+$ ions back to original sites during subsequent lithiation. Each of the above issues may result in capacity degradation, resistance growth, and short cycle life.

Previous efforts to address the issues described above include doping of cations or anions (referred to herein variously as dopants, doping agents, or doping elements) into the cathode material crystal structure. The ultimate goal is stabilization of the cathode material crystal structure by, for example, suppressing phase transformation during the charge/discharge process. Conventionally, such structural stabilization may be accomplished by way of one of two major bulk doping approaches. A first, wet approach includes adding a dopant (typically a salt) in a precursor solution during preparation of the cathode material, so that the dopant is precipitated together with precursors therein. A second, dry approach includes sintering a dopant (typically a salt, oxide, or hydroxide) together with precursors and a lithium source to obtain a final cathode powder.

However, in each of the above approaches, the doping elements, being electrochemically inactive, may result in a decreased specific capacity of the cathode material as a whole. Since at least a portion of a surface of the cathode material is exposed to an electrolyte in the Li-ion battery, and therefore more vulnerable to lattice volume change and phase change than portions of the cathode material not exposed to the electrolyte, restricting doping to the cathode material surface may minimize a sacrifice in capacity while simultaneously achieving structural stabilization. As such, the dopant may be directly mixed with synthesized cathode materials to achieve surface doping. Since such cathode materials have more dense crystal structures than the precursors used in synthesis thereof, the dopant may concentrate more on the surface, and therefore the surface stabilizing effect may be maximized and the capacity sacrifice may be minimized.

In contrast to the bulk doping approaches described hereinabove, a surface doping process may substantially limit the dopant to the surface of the cathode material. Conventional surface doping processes utilize a wet approach, for example, mixing the cathode material with the dopant in an aqueous or non-aqueous solution, and then evaporating solvent(s) and sintering. However, an efficacy of such a wet surface doping process may be restricted by at least three issues. First, if the solvent employed is water, the cathode material structure and composition may be negatively affected. Specifically, Li ions may be leached out by the water, resulting in a Li deficiency at the cathode material surface, which may accompany a concomitant phase change. Second, if the solvent employed is instead an organic solvent, which are often expensive, prohibitively high costs may be incurred during a manufacturing process. Third, manufacturing process costs may further be increased due to evaporation step(s) necessary to remove the solvent (whether water or the organic solvent is utilized) or from waste management processes.

One possible alternative to the wet surface doping process is a dry approach, which may resolve at least some of the issues described hereinabove. A dry surface doping process may include a mixing step, where the cathode material is mixed with the dopant, followed by a calcining/sintering step, where the resultant mixture is calcined/sintered. If a salt was utilized as the dopant in such a surface doping process, an efficiency of said process may be restricted in at least two ways. First, a melting/evaporation temperature of the dopant salt may be lower than, or close to, a doping reaction temperature, which may lead to inaccurate dosage due to evaporation of the dopant salt. Second, a solid-state reaction between the dopant salt and the cathode material may be limited by a size of the dopant salt, which is typically tens of microns or larger, and not uniformly distributed.

The inventors have recognized the above issues ascribed to surface doping processes with dopant salts. To that end, a dry surface doping process employing a metal oxide as the dopant is provided to overcome at least some of the difficulties presented hereinabove. Specifically, the metal oxide dopant may be dry mixed with the cathode material, and then calcined in dry air or oxygen. There are at least four advantages to such a dry surface doping process. First, contact between the cathode material surface and a solvent may be eliminated, precluding any solvent-caused structural damage or phase change therefrom. Second, one or more evaporation steps may be eliminated, as may any waste management steps. Third, the metal oxide dopant may have a higher melting temperature relative to the melting/evaporation temperature of a given dopant salt. As such, an accurate dosage may be guaranteed since there is no melting/evaporation of the metal oxide dopant during the dry surface doping process. Fourth, the metal oxide dopant may be manufactured with well-tuned, smaller particle size having a uniform size distribution relative to a given dopant salt.

As such, a solid-state reaction between the metal oxide dopant and the cathode material is more favorable.

As detailed herein, a cathodic configuration is further provided. In one example, a lithium nickel manganese cobalt oxide compound (NMC) may be dry surface doped with one or more metal dopants including metal ions having an ionic radius larger than 0.50 Å. As an example, the metal dopant may include Nd ($Nd^{3+}$ has a relatively large ionic radius of 0.98 Å). As such, Nd may serve as "pillars" to support and hold the cathode material crystal structure during delithiation/lithiation. Nd doped into the cathode material crystal structure may help suppress lattice volume change and phase change, and thus suppress the formation and growth of cracks. Suppression of crack formation/growth may reduce the creation of new cathode material surface exposed to an electrolyte in a battery by cracking. As such, fewer side reactions between the electrolyte and the cathode material may occur, thereby limiting capacity degradation. Further, increased cathode material crystal structure stability may improve capacity retention during cycling in the battery.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for dry surface doping a cathode material with a dopant, such as a metal dopant. The cathode material may be a lithiated compound, such as a lithium nickel manganese cobalt oxide (NMC), a lithium nickel cobalt aluminum oxide (NCA), a lithium-rich metal oxide, a lithium manganese oxide (LMO), a lithium nickel manganese oxide (LNMO), a lithium iron phosphate (LFP), or a combination thereof. In some examples, the dry surface doping may be applied to an anode material, such as lithium titanate oxide (LTO). The metal dopant may be a metal ion having an ionic radius greater than about 0.50 Å, such as neodymium (Nd). As used herein, "about" when referring to a numerical value may encompass a deviation of 5% or less.

In some examples, a volume of the cathode material may be partitioned into a core, or core region, and a surface, or surface region. As such, the dry surface doping may include doping the metal dopant into the surface of the cathode material. The dry surface doping of the cathode material with the metal dopant may produce a doped cathode material with improved cycling performance and capacity retention relative to an undoped cathode material. In some examples, the doped cathode material produced with the dry surface doping method, or dry-doped cathode material, may have improved cycling performance and capacity retention relative to a comparable doped cathode material produced with a wet surface doping method, or wet-doped cathode material.

Figure 1:
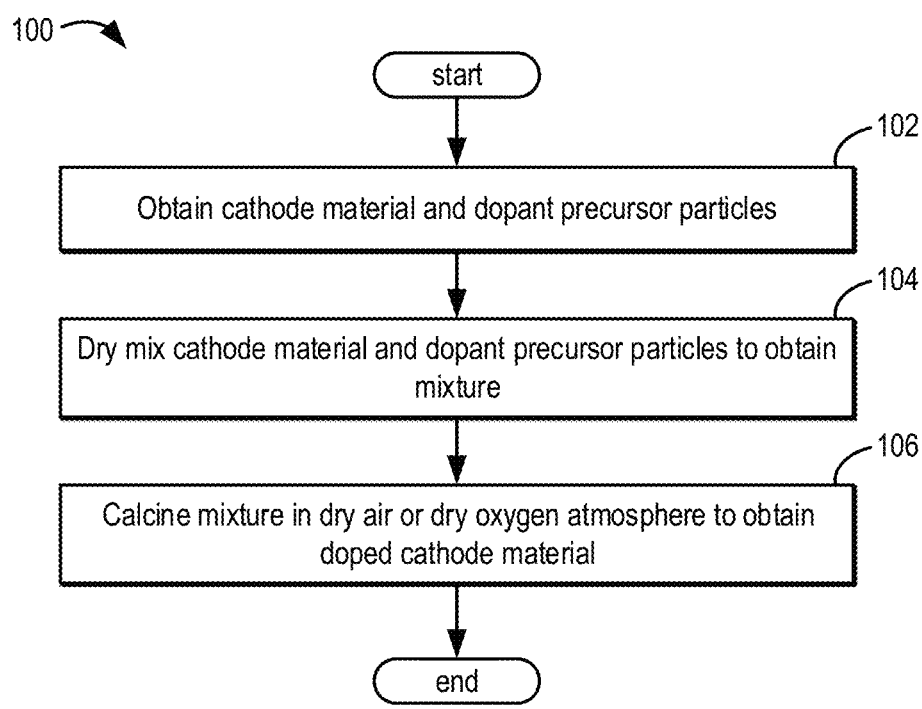
FIG. 1 shows a method for a dry surface doping process.
Figure 2:
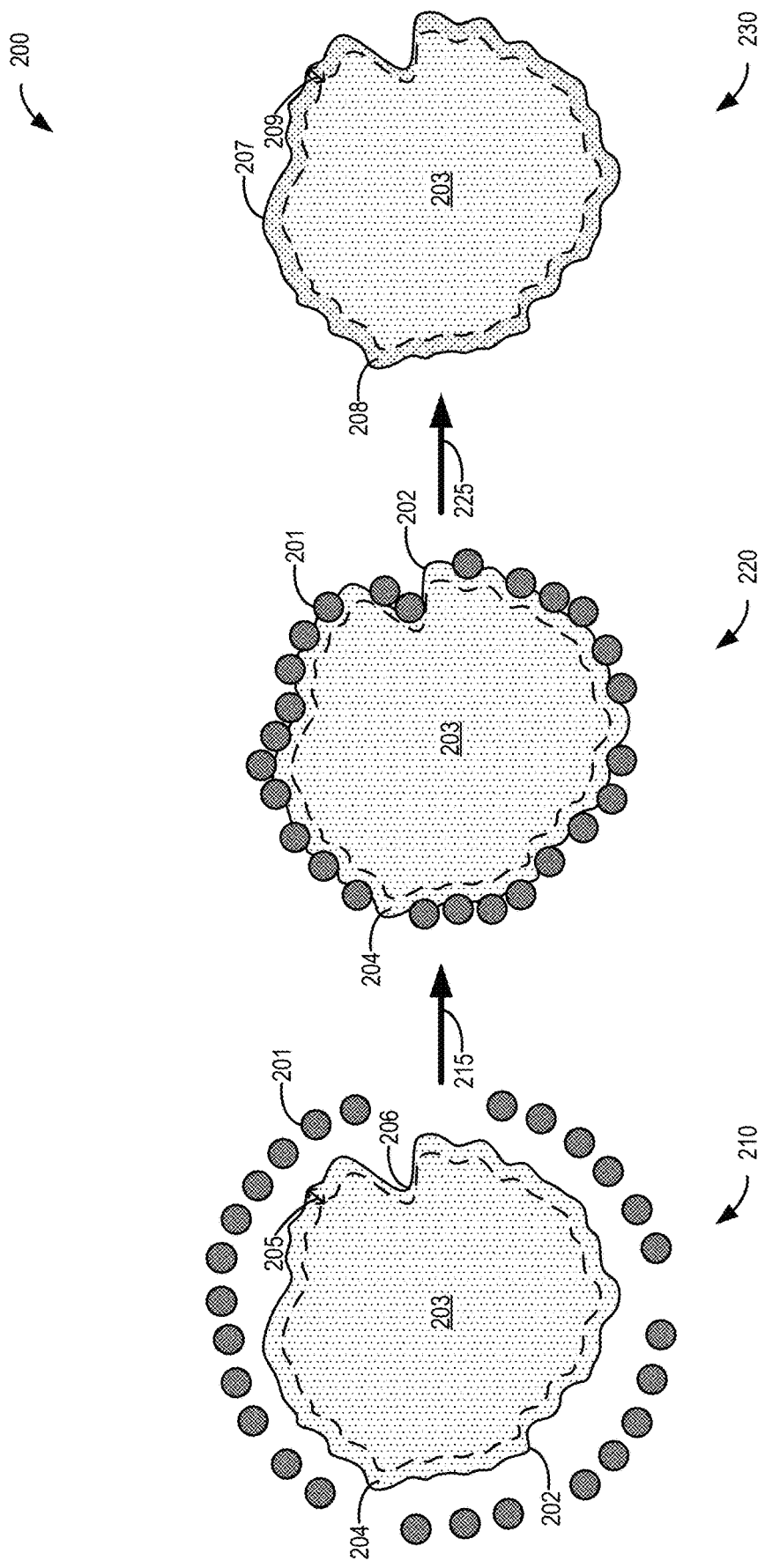
FIG. 2 shows a schematic illustration of the dry surface doping process, and a product thereof.

FIGS. 1 and 2 depict a dry surface doping process for doping a cathode material with a dopant (e.g., a metal dopant). FIG. 1 depicts the dry surface doping process as a flow chart. FIG. 2 depicts the dry surface doping process, and product thereof (that is, a doped cathode material), as a schematic illustration.

Figure 3:
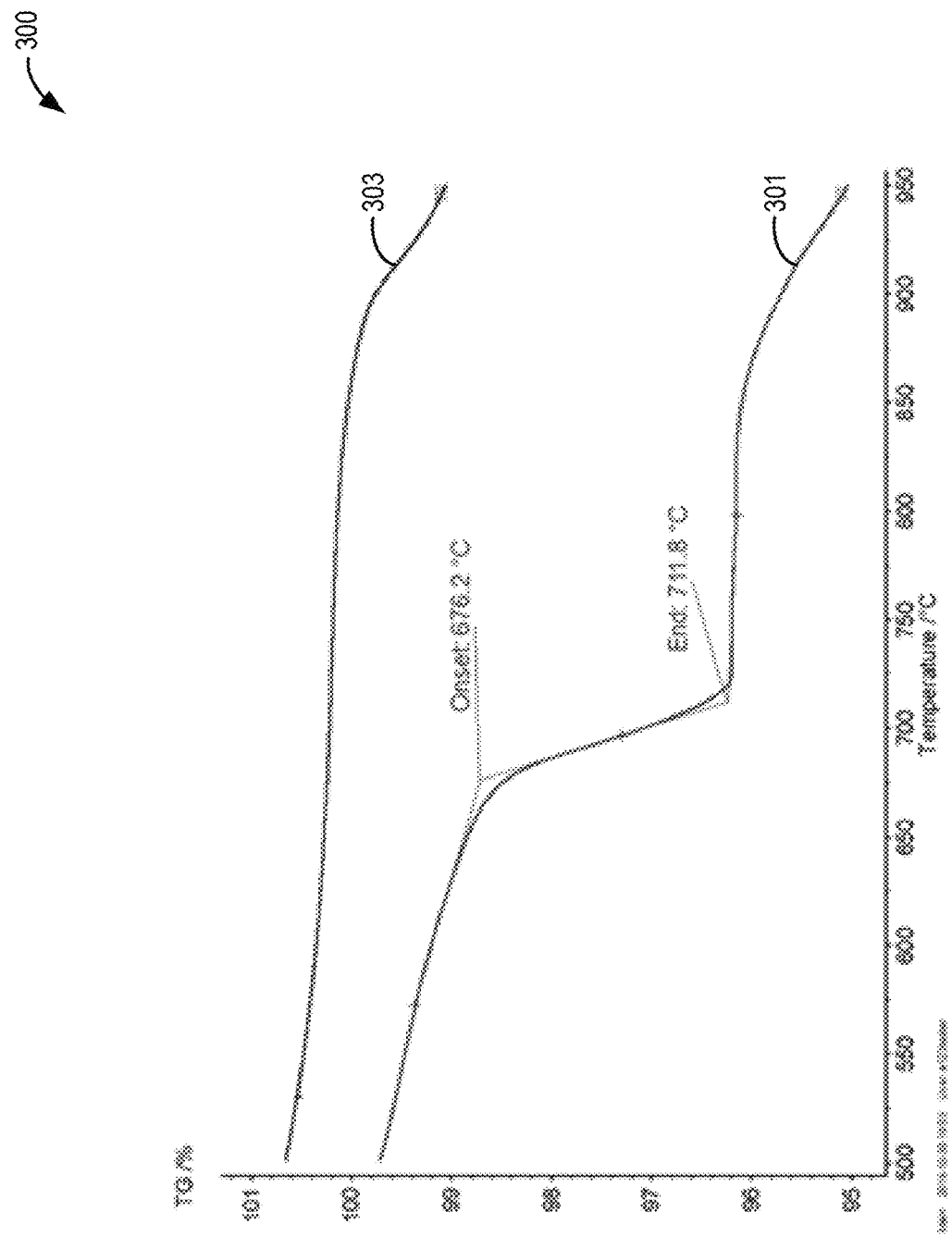
FIG. 3 shows a thermogravimetric analysis (TGA) plot of a lithium nickel manganese cobalt oxide (NMC) and a mixture of NMC and $Nd_2O_3$.
Figure 4:
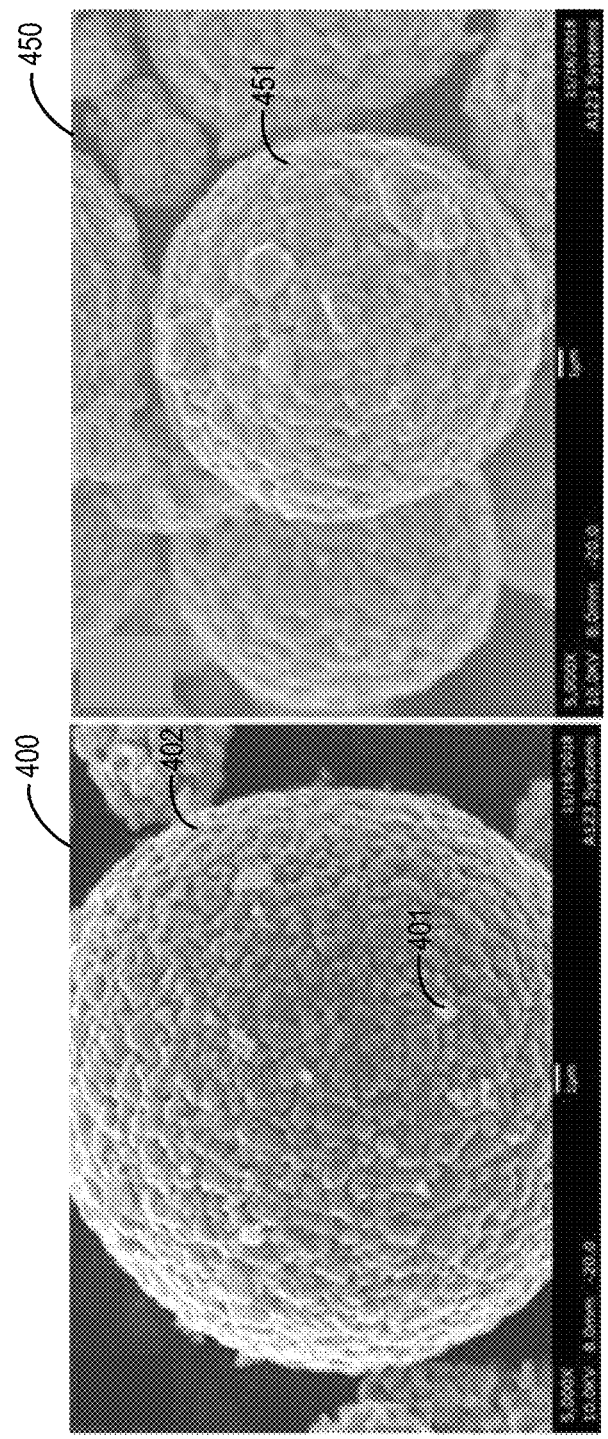
FIG. 4 shows scanning electron microscope (SEM) images of NMC particles mixed with $Nd_2O_3$ particles before and after calcination.
Figure 5:
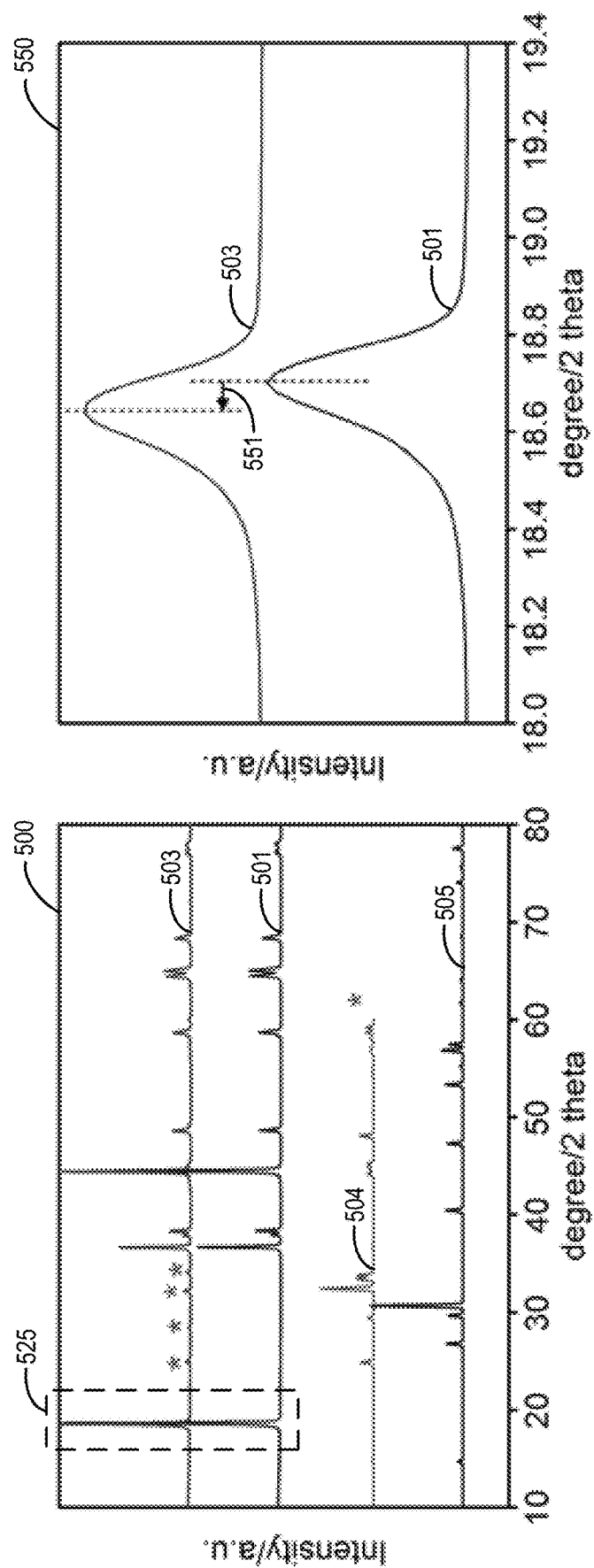
FIG. 5 shows X-ray diffraction (XRD) patterns of NMC, Nd-doped NMC, $Nd_2NiO_4$, and $Nd_2O_3$.

FIG. 3 depicts a TGA plot of undoped NMC and a mixture of NMC and $Nd_2O_3$. From the TGA plot, an appropriate calcination temperature for the dry surface doping process may be determined. FIG. 4 depicts SEM images of NMC particles mixed with $Nd_2O_3$ particles before and after calcination in the dry surface doping process. The $Nd_2O_3$ particles are no longer visible following the calcination. FIG. 5 depicts XRD patterns of NMC, Nd-doped NMC, $Nd_2NiO_4$, and $Nd_2O_3$. As shown, no $Nd_2O_3$ is detected in the Nd-doped NMC.

Figure 6:
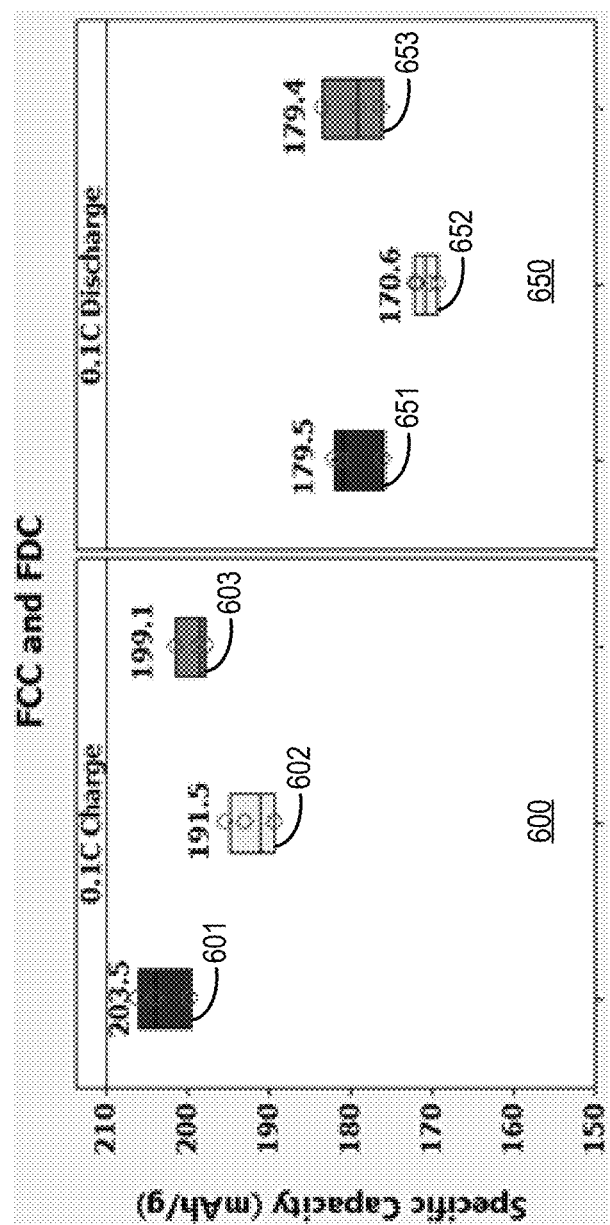
FIG. 6 shows first charge capacities (FCCs) and first discharge capacities (FDCs) in half coin cells for NMC, Nd-doped NMC manufactured by a wet surface doping process, or wet Nd-doped NMC, and Nd-doped NMC manufactured by a dry surface doping process, or dry Nd-doped NMC.
Figure 7:
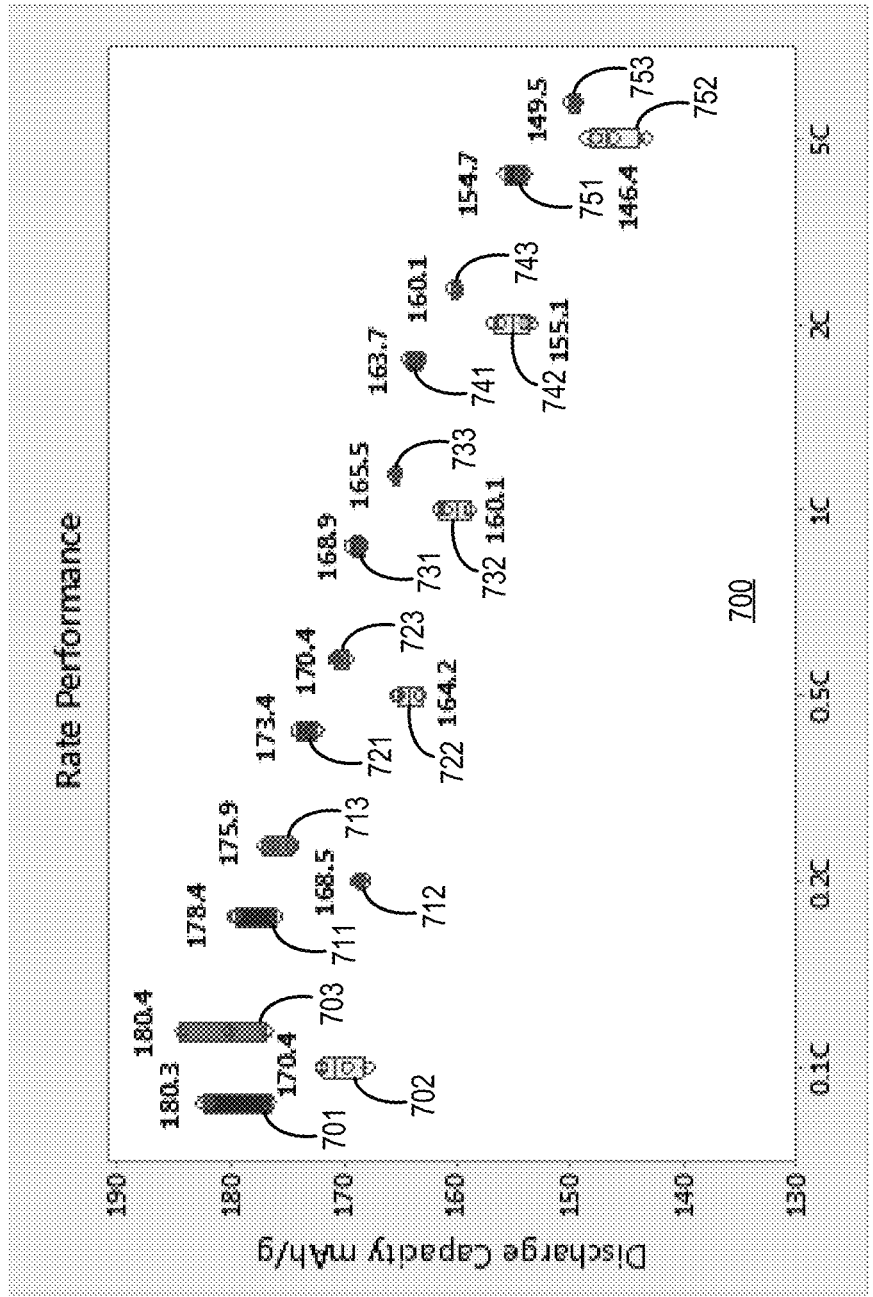
FIG. 7 shows rate capabilities in half coin cells for NMC, wet Nd-doped NMC, and dry Nd-doped NMC.
Figure 8:
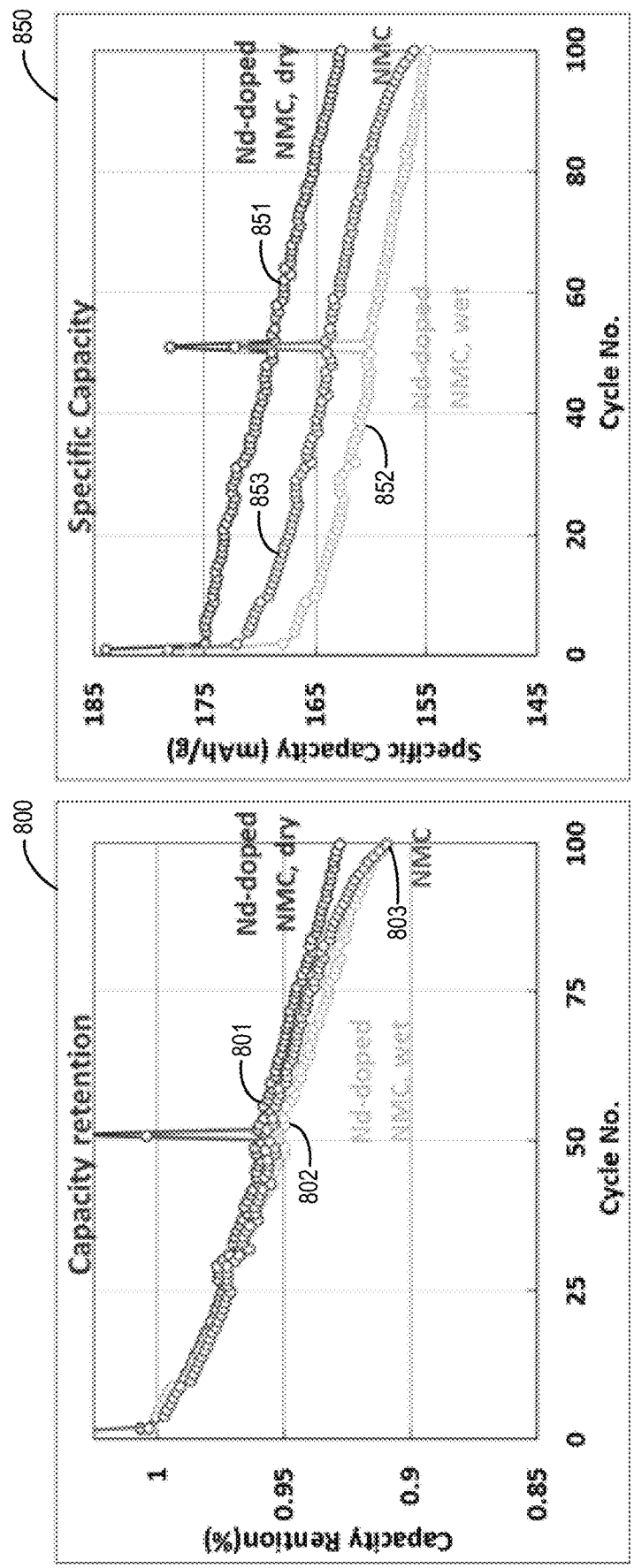
FIG. 8 shows capacity retention and specific capacities over cycling in half coin cells for NMC, wet Nd-doped NMC, and dry Nd-doped NMC.

FIGS. 6-8 depict examples of electrochemical performance of half coin cells including NMC, Nd-doped NMC manufactured by a wet surface doping process (wet Nd-doped NMC), or Nd-doped NMC manufactured by a dry surface doping process (dry Nd-doped NMC). FIG. 6 depicts FCCs and FDCs, FIG. 7 depicts rate capabilities, and FIG. 8 depicts capacity retention and specific capacities over cycling. In each example, the dry-doped NMC either maintains or improves upon the electrochemical performance of NMC and the wet Nd-doped NMC.

Figure 9:
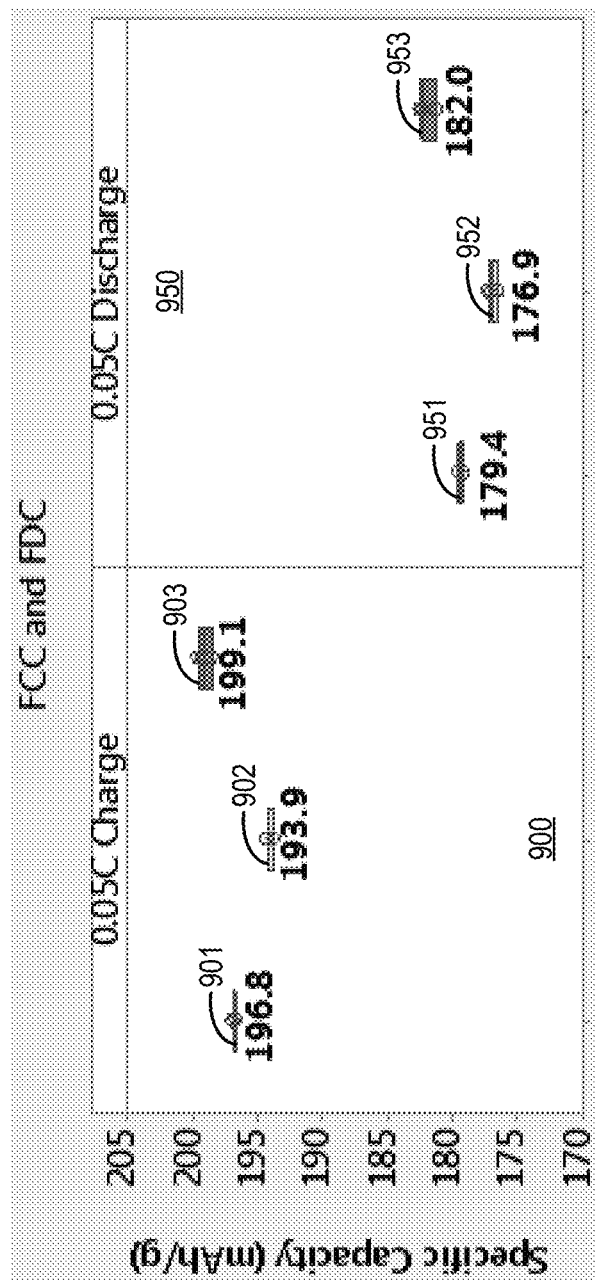
FIG. 9 shows FCCs and FDCs in single layer pouch (SLP) cells for NMC, wet Nd-doped NMC, and dry Nd-doped NMC.
Figure 10:
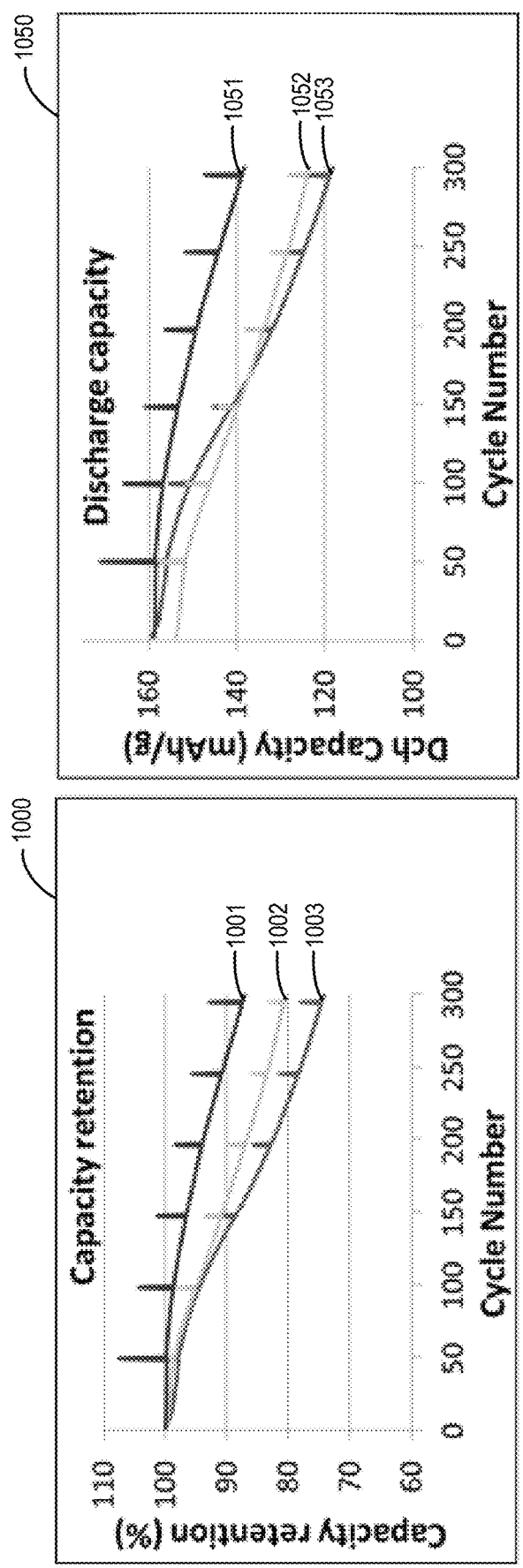
FIG. 10 shows capacity retention and specific discharge capacities over cycling in SLP cells for NMC, wet Nd-doped NMC, and dry Nd-doped NMC.
Figure 11:
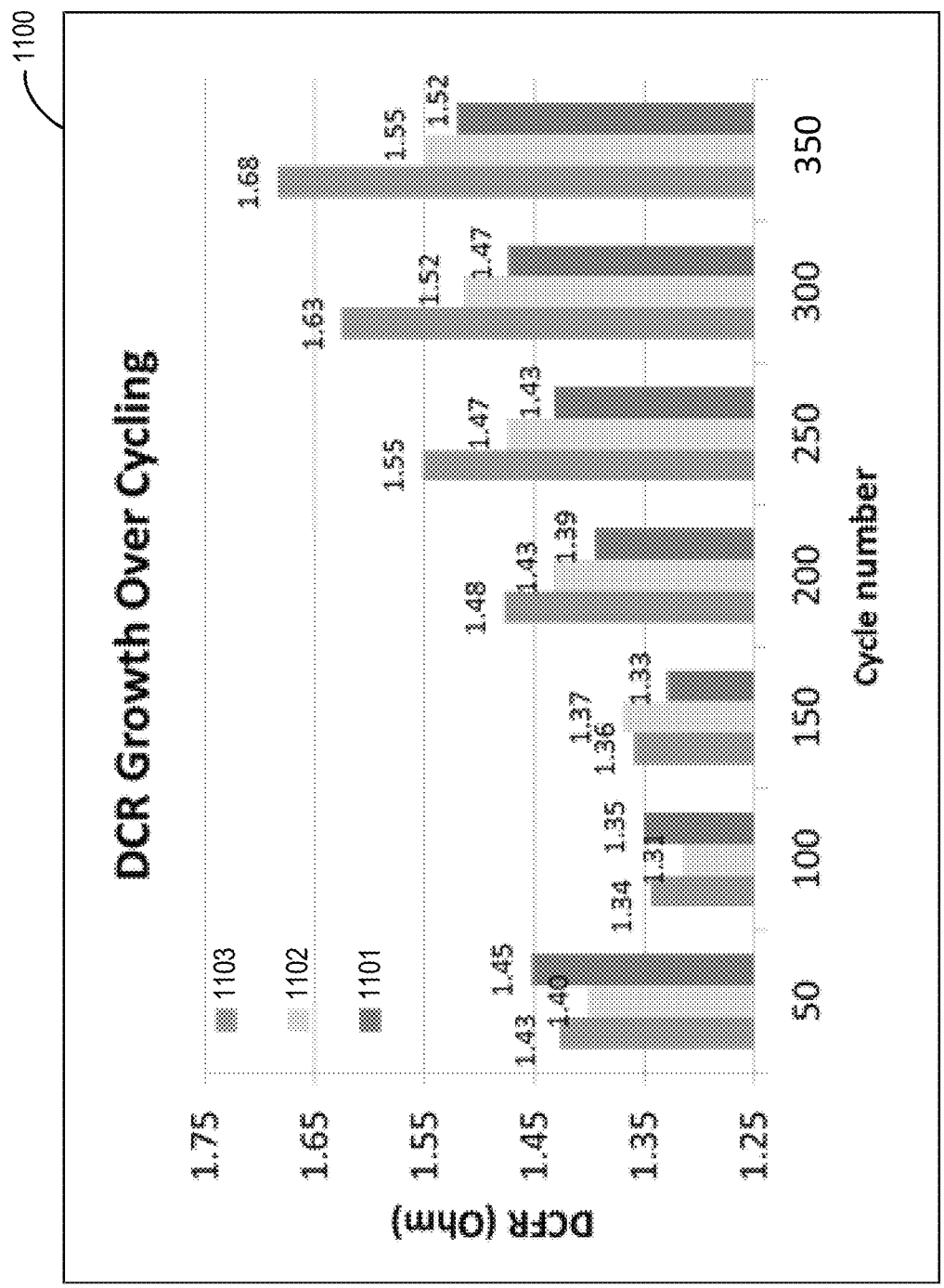
FIG. 11 shows direct current resistance (DCR) growth over cycling in SLP cells for NMC, wet Nd-doped NMC, and dry Nd-doped NMC.

FIGS. 9-11 depict examples of electrochemical performance of SLP cells including NMC, wet Nd-doped NMC, or dry Nd-doped NMC. FIG. 9 depicts FCCs and FDCs, FIG. 10 depicts capacity retention and specific discharge capacities over cycling, and FIG. 11 depicts DCR growth over cycling. In each example, the dry-doped NMC either maintains or improves upon the electrochemical performance of NMC and the wet Nd-doped NMC.

Figure 12:
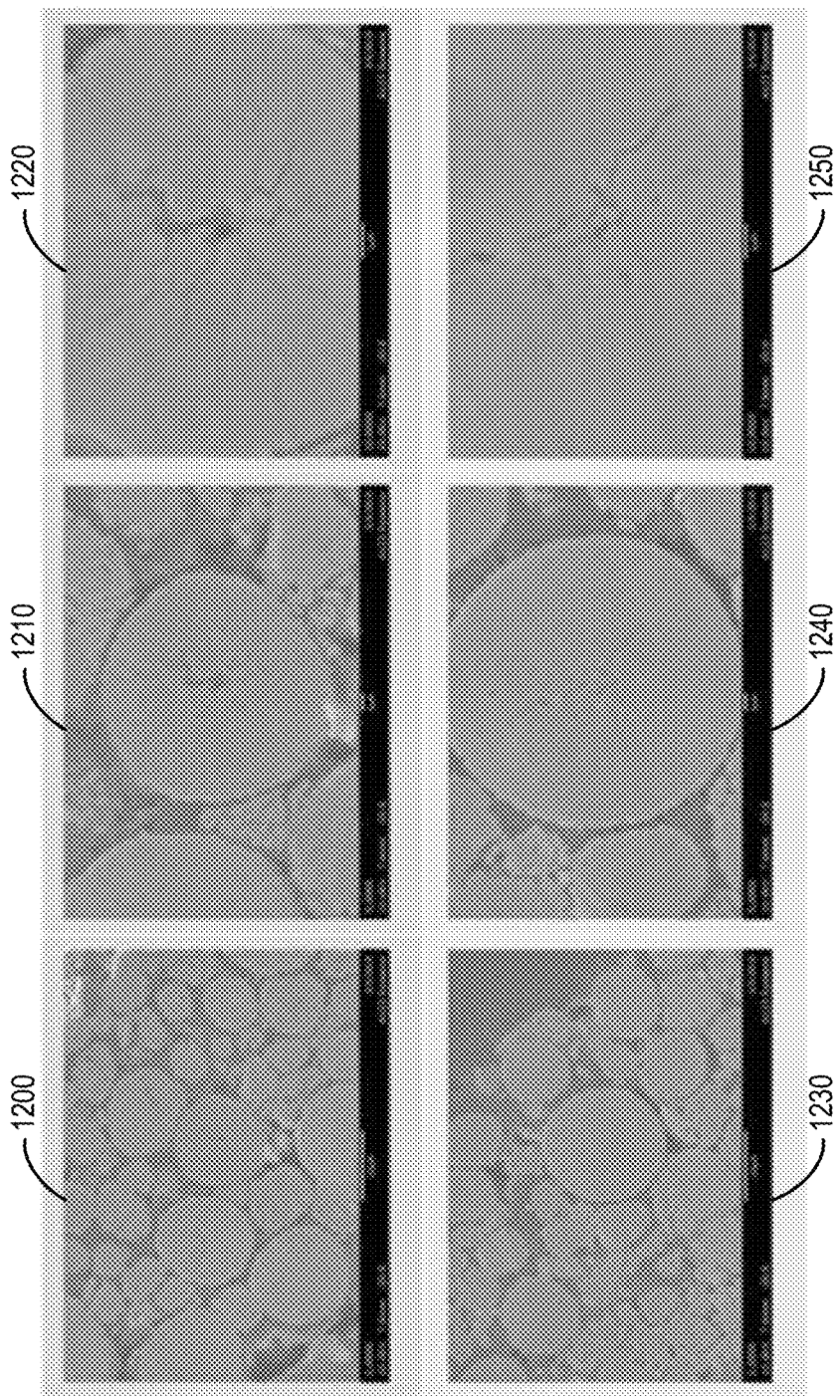
FIG. 12 shows cross-section SEM images of cracks formed in NMC and dry Nd-doped NMC after cycling in SLP cells.
Figure 13:
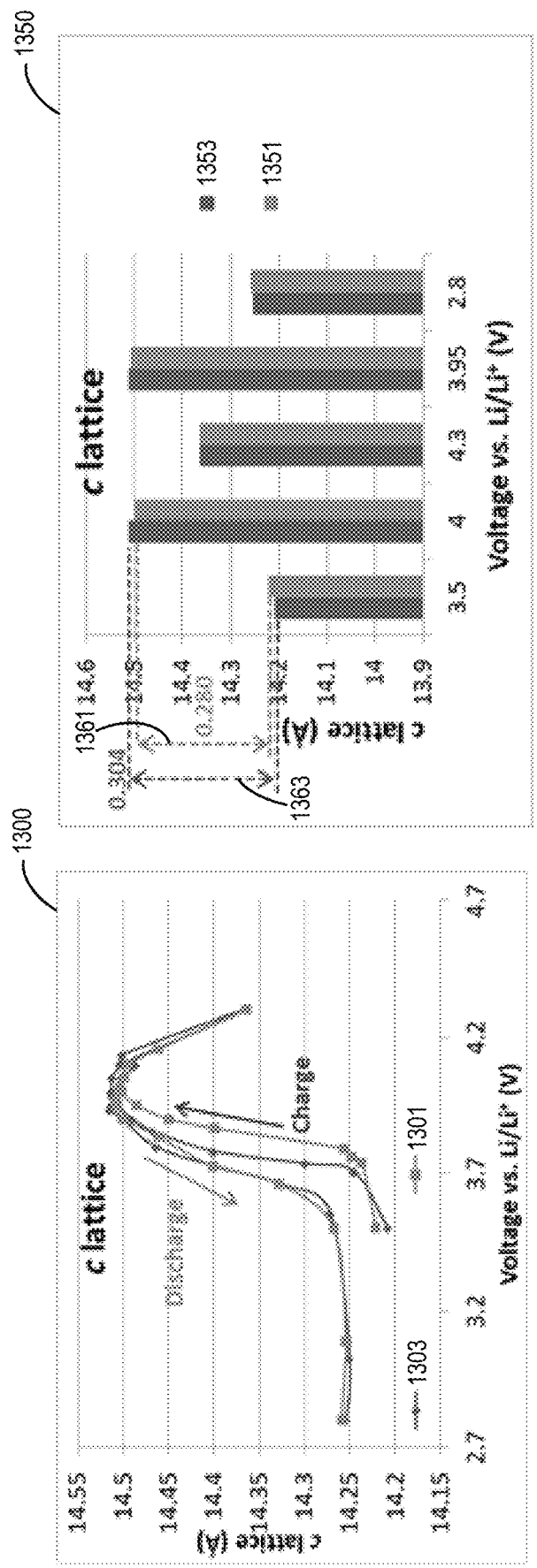
FIG. 13 shows changes in c lattice parameters during initial charging and discharging in half coin cells for NMC and dry Nd-doped NMC.
Figure 14:
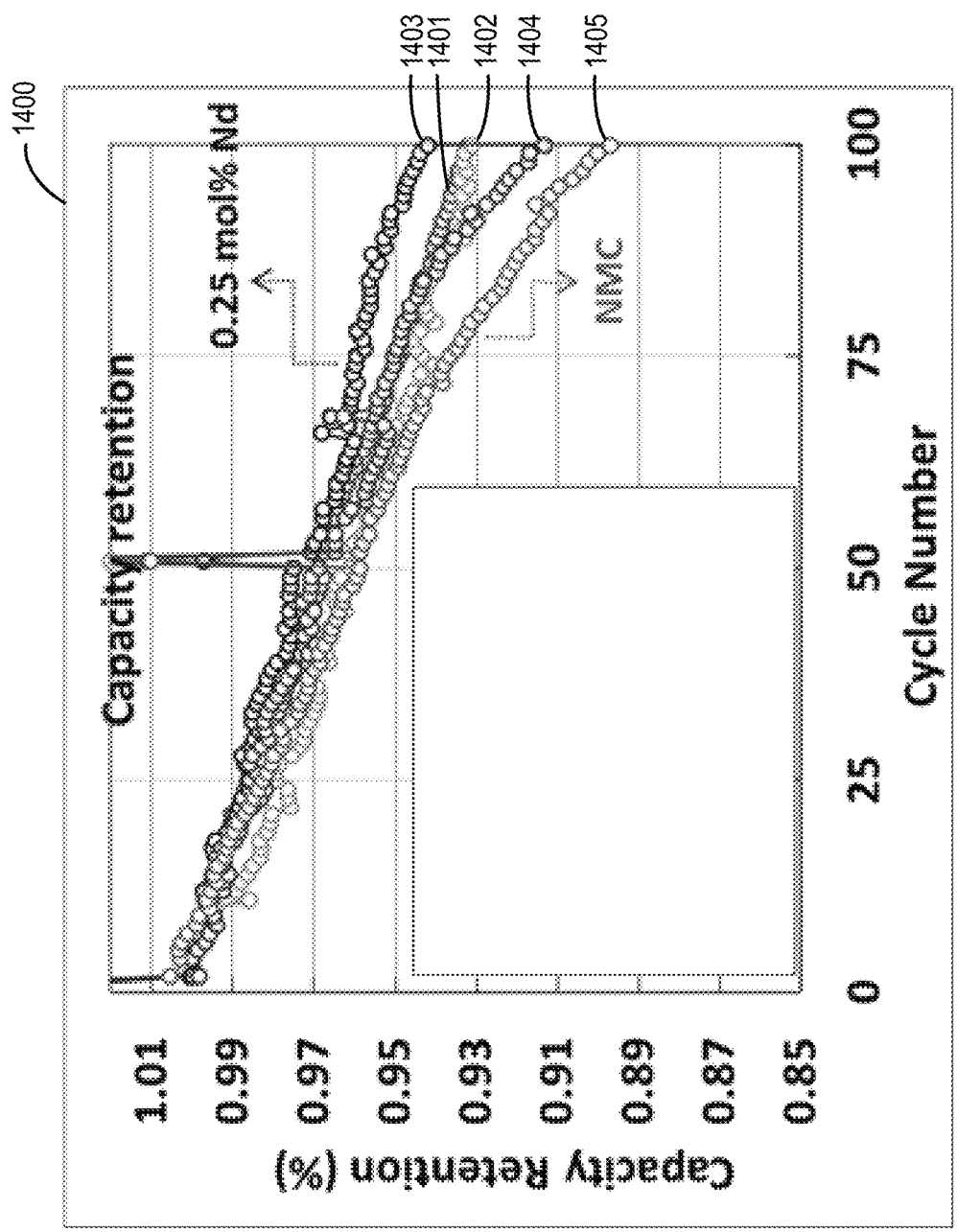
FIG. 14 shows capacity retention over cycling in half coin cells for NMC and dry Nd-doped NMC at various molar ratios of Nd to NMC.
Figure 15:
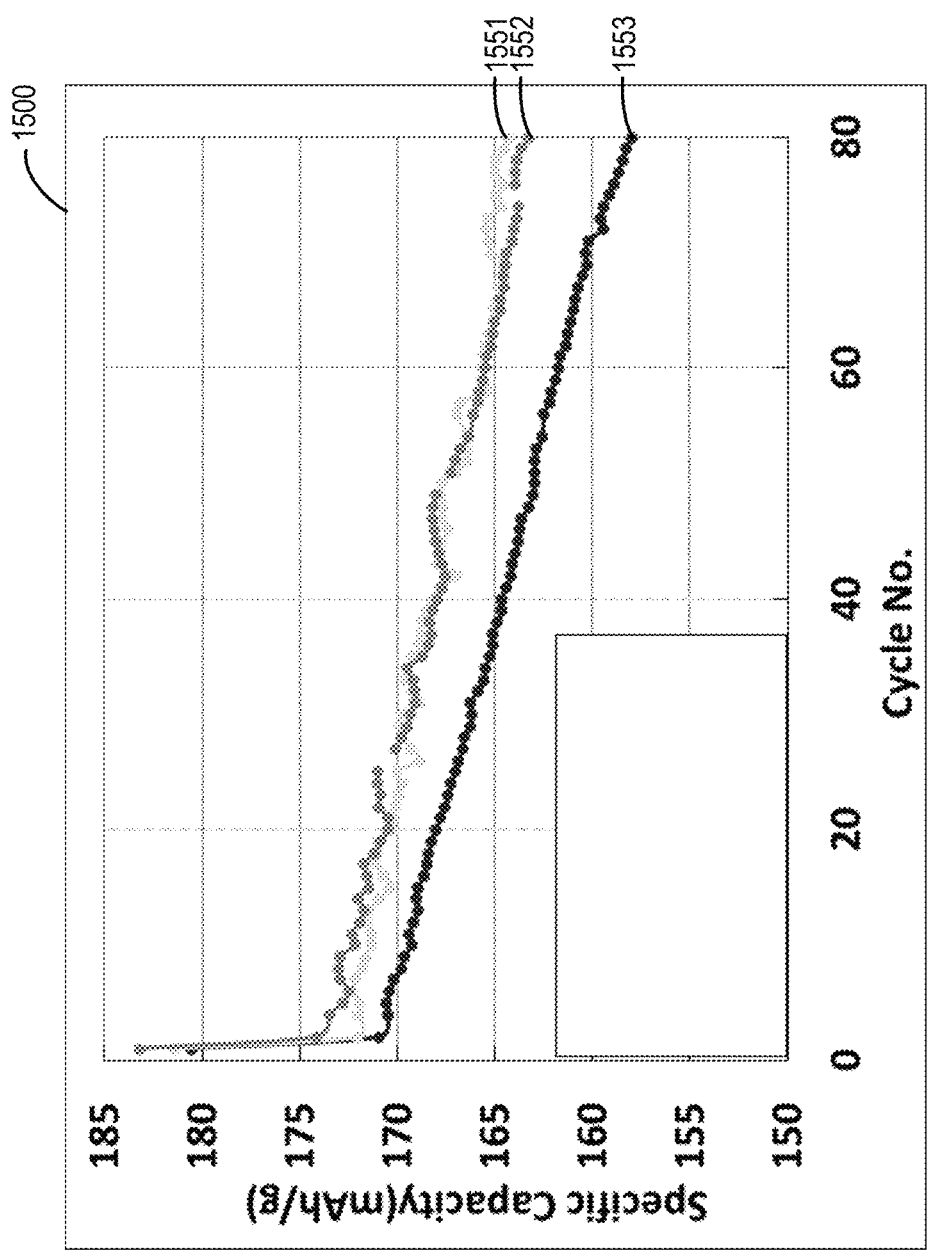
FIG. 15 shows specific capacities over cycling in half coin cells for NMC and dry Nd-doped NMC, where two sizes of the dopant precursor particles were employed in the dry surface doping process.

FIG. 12 depicts cross-section images of cracks formed in NMC and dry Nd-doped NMC after cycling in SLP cells. As shown, fewer, smaller cracks are formed in the dry Nd-doped NMC as compared to undoped NMC. FIG. 13 depicts changes in c lattice parameters during initial charging and discharging in half coin cells for NMC and dry Nd-doped NMC. A smaller change in the c lattice parameter for the dry Nd-doped NMC relative to the undoped NMC indicates less expansion and contraction of a lattice structure of the respective samples. FIG. 14 depicts capacity retention over cycling in half coin cells for NMC and dry Nd-doped NMC at various molar ratios of Nd to NMC, indicating an optimum value for the molar ratio. FIG. 15 depicts specific capacities over cycling in half coin cells for NMC and dry Nd-doped NMC, where two sizes of the dopant precursor particles were employed in the dry surface doping process. As shown, each size of the dopant precursor particles employed resulted in a dry Nd-doped NMC sample having substantially similar specific capacities over cycling.

Referring now to FIG. 1, a method 100 is shown for manufacturing a doped cathode material via a dry surface doping process, including obtaining a cathode material, and dopant precursor particles, mixing the cathode material and the dopant precursor particles to obtain a mixture, and calcining the mixture in dry air or a dry oxygen atmosphere to obtain the doped cathode material.

At 102, the cathode material and the dopant precursor particles may be obtained. The cathode material may be a lithiated compound, such as NMC, NCA, a lithium-rich metal oxide, LMO, LMNO, $LiMPO_4$, or a combination thereof. In one example, the cathode material may be NMC, where NMC may be $LiNi_{0.64}Mn_{0.2}Co_{0.16}O_2$, and the dopant precursor particles may be $Nd_2O_3$. In some examples, the dry surface doping may instead be applied to an anode material, such as LTO.

In one example, the cathode material may include NMC. NMC may have a structural formula of $LiNi_xMn_yCo_{1-x-y}O_2$ ($0 \leq x \leq 1$, $0 \leq y \leq 1$, $0 \leq x+y \leq 1$). Example compositions of NMC may include $LiNi_{0.333}Mn_{0.333}Co_{0.333}O_2$(NMC111), $LiNi_{0.5}Mn_{0.2}Co_{0.3}O_2$(NMC523), $LiNi_{0.6}Mn_{0.2}Co_{0.2}O_2$ (NMC622), and/or $LiNi_{0.8}Mn_{0.1}Co_{0.1}O_2$(NMC811). In one example, NMC may be $LiNi_{0.64}Mn_{0.2}Co_{0.16}O_2$. In another example, the cathode material may include NCA. NCA may have a structural formula of $LiNi_xCo_yAl_{1-x-y}O_2$ ($0 \leq x \leq 1$, $0 \leq y \leq 1$, $0 \leq x+y \leq 1$). In another example, the cathode material may include the lithium-rich metal oxide. The lithium-rich metal oxide may have a structural formula of $xLi_2MnO_3 \cdot (1-x)LiNi_yMn_zCo_{1-y-z}O_2$ ($0 \leq x \leq 1$, $0 \leq y \leq 1$, $0 \leq z \leq 1$, $0 \leq y+z \leq 1$). In another example, the cathode material may include LMO. In one example, LMO may have a structural formula of $LiMn_2O_4$. In another example, the cathode material may include LNMO. LNMO may have a structural formula of $LiNi_xMn_{2-x}O_4$ ($0 \leq x \leq 2$). In another example, the cathode material may include $LiMPO_4$, where M may include Fe, Ni, Co, or Mn, that is, said cathode material may have a structural formula of $LiFePO_4$, $LiNiPO_4$, $LiCoPO_4$ or $LiMnPO_4$, respectively. In some examples, the anode material may be obtained in place of the cathode material. In one example, the anode material may include LTO. In one example, LTO may have a structural formula of $Li_4Ti_5O_{12}$.

In some examples, the cathode material may be in a form of particles. In one example, the particles may be microscale particles. In some examples, a size of the cathode material particles may be greater than about 0.5 μm and less than about 20 μm.

In some examples, the dopant precursor particles may be composed of a dopant precursor, such as a metal oxide precursor or a metal hydroxide precursor. In additional or alternative examples, the dopant precursor may include one or more compounds, including, for example, one or more of dopant oxides, dopant acetates, dopant nitrides, dopant sulfates, dopant fluoride, dopant nitrate, dopant phosphide, dopant sulfide, dopant iodide, dopant phosphate, dopant carbonate, dopant oxalate, dopant acetylacetonate, and combinations thereof. As further examples, the dopant precursor may include one or more compounds such as neodymium oxides, neodymium acetates, neodymium nitrides, neodymium sulfates, neodymium fluoride, neodymium nitrate, neodymium phosphide, neodymium sulfide, neodymium iodide, neodymium phosphate, neodymium carbonate, neodymium oxalate, neodymium acetylacetonate, and combinations thereof. In some examples, the metal oxide precursor includes one or more metal oxides. In some examples, the metal hydroxide precursor includes one or more metal hydroxides. The one or more metal oxides may include any metal oxide which may react with the cathode material at a temperature below 950° C. The one or more metal hydroxides may include any metal hydroxide which may react with the cathode material at a temperature below 950° C. As examples, the dopant precursor may include one or more alkali metal oxides, alkali metal hydroxides, alkaline earth metal oxides, alkaline earth metal hydroxides, rare earth oxides, rare earth hydroxides, transition metal oxides, and transition metal hydroxides. In some examples, the one or more metal oxides may include one or more of $Na_2O$, $Na_2O_2$, $SiO_2$, $KO_2$, $K_2O_2$, $CaO$, $RuO_2$, $Ta_2O_5$, $WO_3$, $CoO$, $Co_3O_4$, $Ga_2O_3$, $Al_2O_3$, $ZrO_2$, $MgO$, $Sc_2O_3$, $FeO$, $Fe_2O_3$, $V_2O_5$, $NbO$, $NbO_2$, $Nb_2O_5$, $Cu_2O$, $CuO$, $ZnO$, $Rh_2O_3$, $RhO_2$, $TiO_2$, $MoO_2$, $MoO_3$, $CrO$, $Cr_2O_3$, $CrO_2$, $CrO_3$, $MnO$, $Mn_3O_4$, $Mn_2O_3$, $GeO$, $Rb_2O$, $SrO$, $Y_2O_3$, $In_2O_3$, $La_2O_3$, $CeO_2$, $Pr_2O_3$, $Nd_2O_3$, $Sm_2O_3$, $Eu_2O_3$, $Tb_2O_3$, and $Tb_4O_7$. In one example, the one or more metal oxides may include $Nd_2O_3$. In some examples, the one or more metal hydroxides may include one or more of $NaOH$, $Si(OH)_4$, $KOH$, $Ca(OH)_2$, $Ru(OH)_3$, $Ru(OH)_4$, $Ta(OH)_5$, $W(OH)_6$, $Co(OH)_2$, $Co(OH)_3$, $Ga(OH)_3$, $Al(OH)_3$, $Zr(OH)_4$, $Mg(OH)_2$, $Sc(OH)_3$, $Fe(OH)_2$, $Fe(OH)_3$, $V(OH)_5$, $Nb(OH)_2$, $Nb(OH)_5$, $CuOH$, $Cu(OH)_2$, $Zn(OH)_2$, $Rh(OH)_3$, $Ti(OH)_4$, $Mo(OH)_4$, $Mn(OH)_6$, $Cr(OH)_2$, $Cr(OH)_3$, $Cr(OH)_4$, $Mn(OH)_2$, $Mn(OH)_3$, $Ge(OH)_2$, $RbOH$, $Sr(OH)_2$, $Y(OH)_3$, $In(OH)_3$, $La(OH)_3$, $Ce(OH)_4$, $Pr(OH)_3$, $Nd(OH)_3$, $Sm(OH)_3$, $Eu(OH)_3$, and $Tb(OH)_3$. In some examples, each of the one or more metal oxides and the one or more metal hydroxides may include a metal ion having an ionic radius of greater than about 0.50 Å. In some examples, each of the one or more metal oxides and the one or more metal hydroxides may include a metal ion having an ionic radius of greater than about 0.60 Å. In some examples, each of the one or more metal oxides and the one or more metal hydroxides may include a metal ion having an ionic radius of greater than about 0.70 Å. In some examples, each of the one or more metal oxides and the one or more metal hydroxides may include a metal ion having an ionic radius of greater than about 0.80 Å. In some examples, each of the one or more metal oxides and the one or more metal hydroxides may include a metal ion having an ionic radius of greater than about 0.90 Å.

In some examples, a size of the dopant precursor particles may be greater than about 1 nm and less than about 10 μm. In some examples, the size of the dopant precursor particles may be greater than about 5 nm and less than about 5 μm. In some examples, the size of the dopant precursor particles may be greater than about 80 nm and less than about 720 nm. In some examples, the size of the dopant precursor particles may be greater than about 80 nm and less than about 400 nm. In some examples, the size of the dopant precursor particles may be greater than about 80 nm and less than about 300 nm. In some examples, the size of the dopant precursor particles may be greater than about 80 nm and less than about 200 nm. In some examples, the size of the dopant precursor particles may be greater than about 80 nm and less than about 140 nm. In some examples, the size of the dopant precursor particles may be greater than about 400 nm and less than about 720 nm. In some examples, the size of the dopant precursor particles may be greater than about 500 nm and less than about 720 nm. In some examples, the size of the dopant precursor particles may be greater than about 600 nm and less than about 720 nm. In some examples, the size of the dopant precursor particles may be greater than about 660 nm and less than about 720 nm.

The dopant precursor particles may be milled to a predetermined average size. In some examples, the dopant precursor particles may be milled via a ball or attrition milling process for a selected period depending on desired size. In one example, the dopant precursor particles may be milled to a finer powder with an average size of less than 1 μm. In one example, a volume may be half-filled with an inert media, such as YTZ® grinding media, of <5 mm size and the dopant precursor particles. The volume may be milled to produce a finer powder with an average size of less than 1 μm.

At 104, the cathode material and the dopant precursor particles may be dry mixed or dry blended (that is, mixed or blended substantially without any solvent), to obtain a mixture, or dry mixture, or pre-calcination mixture. In some examples, the dry mixing may include mixing in a roller mill mixer to achieve a uniform dispersion, or distribution, of the dopant precursor particles into a surface, or surface region, of the cathode material. Further, in some examples, following the mixing, the dopant precursor particles may protrude from, or be embedded into, the cathode material surface. In some examples, following the mixing, the dopant precursor particles may protrude from the cathode material surface at a distance of 0 to 10 μm (e.g., up to 10 μm).

Herein, "uniform" may be used to describe substantially similar density of the dopant precursor particles, or dopants therefrom, in any threshold portion of the surface (e.g., a total surface area, less than the total surface area) of the cathode material.

At 106, the mixture may be calcined in a dry calcination atmosphere, such as dry air or a dry oxygen atmosphere, to obtain a doped cathode material. Specifically, the dry calcination atmosphere may include at least oxygen or air, that is, calcination is not performed in vacuum, or near-vacuum, conditions. In some examples, the mixture may be calcined at a temperature of less than 950° C. In some examples, the calcination temperature may be less than 900° C. In some examples, the calcination temperature may be less than 800° C. In some examples, the calcination temperature may be about 750° C. In one example, the mixture may be calcined in the dry oxygen atmosphere at the temperature of 750° C. for 4 h with a temperature ramping rate of 5° C./min. The calcination temperature may be selected so as to avoid degradation/melting/evaporation of one or both of the cathode material and the dopant precursor particles. As such, the calcination temperature may be adjusted based upon the composition of one or both of the cathode material and the dopant precursor particles. Further, during the calcination, a reaction between the dopant precursor particles and the cathode material may occur. As such, the calcination temperature may be selected to allow for the reaction to proceed in a controlled manner. The calcination temperature may be determined based on a TGA plot (such as the TGA plot described below with reference to FIG. 3).

Selection of a polycrystalline material, such as NMC, as the cathode material may affect kinetics of calcination relative to single crystalline materials, such as lithium cobalt oxide, due to a presence of grain boundaries. That is, a single secondary particle of a polycrystalline material is composed of multiple single crystals, or primary particles, wherein each primary particle corresponds to an additional grain boundary. One skilled in the art will appreciate that dry surface doping of polycrystalline materials may require fundamentally different procedures than dry surface doping of single crystalline materials.

Following calcination, the obtained doped cathode material may be characterized with SEM and XRD to determine morphology and crystal structure, respectively (such as the SEM images and XRD patterns described below with reference to FIGS. 4 and 5, respectively). In some examples, following calcination, the dopant precursor particles are not present, or are substantially not present, following the calcination.

During the calcination, reaction of the cathode material and the dopant precursor particles may release oxygen from the dopant precursor particles. As such, in some examples, following calcination, the dopant precursor particles are not present, or are substantially not present, and the doped cathode material may include one or more dopants uniformly doped into a surface thereof, where the dopants include one or more of B, N, F, Na, Si, Cl, K, Ca, Ga, Ru, Ta, W, Co, Al, Zr, Mg, Sc, Fe, V, Nb, Cu, Zn, Rh, Y, Ti, Mo, Cr, Mn, Ce, Sm, Nd, Pr, La, Ge, Rb, Sr, In, Eu, and Tb. In some examples, the doped cathode material may include one or more metal ions from the dopant precursor particles. In one example, the doped cathode material may include Nd, or $Nd^{3+}$.

In some examples, in the doped cathode material, a weight ratio of the one or more dopants to the cathode material may be less than about 15 wt. %. In some examples, the weight ratio may be less than about 1 wt. %. In some examples, the weight ratio may be about 1 wt. %. In some examples, the weight ratio may be greater than about 0.01 wt. % and less than about 15 wt. %. In some examples, the weight ratio may be greater than about 0.25 wt. % and less than about 8 wt. %. In some examples, the weight ratio may be greater than about 0.25 wt. % and less than about 6 wt. %. In some examples, the weight ratio may be greater than about 0.25 wt. % and less than about 4 wt. %. In some examples, the weight ratio may be greater than about 0.25 wt. % and less than about 2 wt. %. In some examples, the weight ratio may be greater than about 0.25 wt. % and less than about 1 wt. %. In some examples, the weight ratio may be greater than about 0.25 wt. % and less than about 0.5 wt. %. In some examples, the weight ratio may be about 0.5 wt. %. In some examples, the weight ratio may be about 0.4 wt. %. In some examples, the weight ratio may be about 0.3 wt. %. In some examples, the weight ratio may be about 0.25 wt. %.

In some examples, in the doped cathode material, a molar ratio of the one or more dopants to the cathode material may be less than about 15 mol %. In some examples, the molar ratio may be greater than about 0.01 mol %. In some examples, the molar ratio may be about 0.68 mol %. In some examples, the molar ratio may be greater than about 0.01 mol % and less than about 0.68 mol %. In some examples, the molar ratio may be greater than about 0.15 mol % and less than about 0.4 mol %. In some examples, the molar ratio may be greater than about 0.15 mol % and less than about 0.25 mol %. In some examples, the molar ratio may be greater than about 0.25 mol % and less than about 0.4 mol %. In some examples, the molar ratio may be about 0.25 mol %. In some examples, the weight ratio or the molar ratio may be selected so as to achieve balanced cycling performance, specific capacity, DCR, and mechanical strength of a cathode incorporating the doped cathode material in a battery.

In some examples, at least a portion of the dopant in the doped cathode material may be exposed to a surrounding environment. In some examples, the surrounding environment may be an electrolyte in a battery. As such, in some examples, the doped cathode material may be combined with conductive additives and a binder to manufacture a positive electrode, or a cathode. Further, the battery may be manufactured, such that the battery includes the cathode as described above, a negative electrode, or an anode, a separator disposed between the cathode and the anode, and the electrolyte. In some examples, the negative electrode may include lithium metal, silicon, graphite, a silicon-graphite composite, LTO, or a combination thereof. In some examples, the battery may be a lithium-ion battery, such as a secondary lithium-ion battery. In further examples, the battery may be one of a plurality of batteries in a battery pack, wherein each of the plurality of batteries are identical to said battery.

Referring now to FIG. 2, a schematic illustration 200 of a dry surface doping process, such as the dry surface doping process described above with reference to FIG. 1, is shown. It will be understood, however, that elements/features described with reference to FIG. 2, while being substantially similar to one or more elements/features described above with reference to FIG. 1, are merely exemplary, and may therefore not be limited to description provided hereinabove with reference to FIG. 1.

A first example illustration 210 depicts a plurality of dopant precursor particles 201, such as the dopant precursor particles described above with reference to FIG. 1. As such, in some examples, the dopant precursor particles may include one or more metal oxides. In some examples, the dopant precursor particles may include $Nd_2O_3$.

In some examples, an average size of the dopant precursor particles 201 may be greater than 1 nm and less than 10 μm. In some examples, the average size of the dopant precursor particles 201 may be greater than 5 nm and less than 5 μm. In some examples, the average size of the dopant precursor particles 201 may be greater than 80 nm and less than 720 nm. In some examples, the average size of the dopant precursor particles 201 may be greater than 80 nm and less than 400 nm. In some examples, the average size of the dopant precursor particles 201 may be greater than 80 nm and less than 300 nm. In some examples, the average size of the dopant precursor particles 201 may be greater than 80 nm and less than 200 nm. In some examples, the average size of the dopant precursor particles 201 may be greater than 80 nm and less than 140 nm. In some examples, the average size of the dopant precursor particles 201 may be greater than 400 nm and less than 720 nm. In some examples, the average size of the dopant precursor particles 201 may be greater than 500 nm and less than 720 nm. In some examples, the average size of the dopant precursor particles 201 may be greater than 600 nm and less than 720 nm. In some examples, the average size of the dopant precursor particles 201 may be greater than 660 nm and less than 720 nm. In some examples, a relationship between the dopant precursor particles 201 may be formed such that each dopant precursor particle 201 may have a similar size. In some examples, a dopant precursor particle size distribution may be a normal distribution.

The first example illustration 210 further depicts a cathode material 202, such as the cathode material described above with reference to FIG. 1. As such, in some examples, the cathode material 202 may be NMC. In one example, NMC may be $LiNi_{0.64}Mn_{0.2}Co_{0.16}O_2$. The cathode material 202 may include a volume partitioned into a core 203, or core region 203, and a surface 204, or surface region 204. In some examples, the core region 203 may include a larger volume than the surface region 204. In some examples, the surface region 204 may extend to a threshold depth 205 towards a center of the cathode material 202. That is, the threshold depth 205 may be a maximum possible extent, or depth, of the surface region 204 in a direction towards the center of the cathode material 202. In some examples, a depth of at least one portion of the surface region 204 may vary from a depth of at least one other portion of the surface region 204.

In some examples, the threshold depth 205 may be equal to a radius of the cathode material 202. In some examples, the cathode material 202 may have no, or substantially no, core region 203. In some examples, the threshold depth 205 may be 10 μm. In some examples, the threshold depth 205 may be 5 μm. In some examples, the threshold depth 205 may be 2 μm. In some examples, the threshold depth 205 may be 1 μm. In some examples, the threshold depth 205 may be 500 nm. In some examples, the threshold depth 205 may be 100 nm.

In some examples, the cathode material 202 may be in a form of particles. In some examples, an average particle size of the cathode material 202 may be at least 0.5 μm and at most 20 μm. In some examples, a relationship between the particles of the cathode material 202 may be formed such that each particle may have a similar size. In some examples, a cathode material particle size distribution may be a normal distribution. In some examples, the particles of the cathode material 202 may be larger, secondary particles composed of smaller, primary particles.

In some examples, the cathode material 202 may include one or more surface structures 206 disposed on an exterior of the cathode material 202. Such surface structures 206 may be openings or cracks within the surface region 204 of the cathode material 202. The size and depth of the surface structures 206 may respectively vary. In some examples, the surface structures 206 may be irregular such that the surface structures 206 may have different shapes and sizes. The surface structures 206 may increase a surface area of the cathode material 202.

The dopant precursor particles 201 and the cathode material 202 may be dry mixed by a dry mixing 215, such as the dry mixing described above with reference to FIG. 1. A result of the dry mixing 215 is depicted by a second example illustration 220.

Specifically, the second example illustration 220 depicts the dopant precursor particles 201 uniformly dispersed, or distributed, in the surface region 204 of the cathode material 202. In some examples, the dopant precursor particles 201 may protrude from, or be embedded into, the surface region 204 via the surface structures 206. Specifically, in some examples, the dopant precursor particles 201 may protrude from the surface region 204 at a distance of 0 to 10 μm (e.g., up to 10 μm). As such, the dopant precursor particles 201 may not extend into the core region 203.

In some examples, the dopant precursor particles 201 may adhere to or within the surface structures 206 via one or both of van der Waals molecular forces and mechanical forces. As such, a size of each of the dopant precursor particles 201 may be complementary to a size of reciprocal surface structures 206 such that the dopant precursor particles 201 may be partially or fully secured therein. In some examples, the dopant precursor particles 201 may be milled to a pre-selected average size. The pre-selected average size of the dopant precursor particles 201 may result in retention of said particles on and partially within surface structures 206 of complementary size on the exterior of the cathode material 202. In other examples, the dopant precursor particles 201 may have substantially different sizes such that the dopant precursor particles 201 may be retained in matching-sized reciprocal surface structures 206.

The dopant precursor particles 201 and the cathode material 202 may be calcined by a calcination 225, such as the calcination described above with reference to FIG. 1. A result of the calcination 225 is depicted by a third example illustration 230.

Specifically, the third example illustration 230 depicts a doped cathode material 207, such as the doped cathode material described above with reference to FIG. 1. The doped cathode material 207 may include a volume partitioned into the core region 203, and a doped surface 208, or doped surface region 208. Following the calcination 225, the core region 203 may undergo no, or substantially no, chemical or physical change. In some examples, the core region 203 may include a larger volume than the doped surface region 208. In some examples, the doped surface region 208 may extend to a threshold depth 209 towards a center of the doped cathode material 207. That is, the threshold depth 209 may be a maximum possible extent, or depth, of the doped surface region 208 in a direction towards a center of the doped cathode material 207. As such, in some examples, dopants from the dopant precursor particles 201 may be dispersed throughout the doped cathode material 207 following the calcination 225. In some examples, the threshold depth 209 of the doped surface region 208 may be about equal to the threshold depth 205 of the surface region 204. In some examples, a depth of at least one portion of the doped surface region 208 may vary from a depth of at least one other portion of the doped surface region 208. The threshold depth 209 of the doped surface region 208 may depend upon one or more of the size of the dopant precursor particles 201, a size of the cathode material 202, a duration of the calcination 225 (that is, a duration of a reaction between the dopant precursor particles 201 and the cathode material 202), and a temperature of the calcination 225.

In some examples, the threshold depth 209 may be equal to a radius of the doped cathode material 207. In some examples, the doped cathode material 207 may have no, or substantially no, core region 203. In some examples, the threshold depth 209 may be 10 μm. In some examples, the threshold depth 209 may be 5 μm. In some examples, the threshold depth 209 may be 2 μm. In some examples, the threshold depth 209 may be 1 μm. In some examples, the threshold depth 209 may be 500 nm. In some examples, the threshold depth 209 may be 100 nm.

During the calcination 225, the reaction of the dopant precursor particles 201 and the cathode material 202 may release oxygen from the dopant precursor particles 201. As such, in some examples, following the calcination 225, the dopant precursor particles 201 are not present, or are substantially not present, in the doped cathode material 207. As such, the doped surface region 208 of the doped cathode material 207 may include one or more dopants uniformly doped therein. In some examples, the doped cathode material 207 may include one or more metal ions from the dopant precursor particles 201. In one example, the doped surface region 208 of the doped cathode material 207 may include Nd, or $Nd^{3+}$.

In some examples, prior to the calcination 225, each of the core region 203 and the surface region 204 may be composed of the cathode material 202. In some examples, following the calcination 225, the core region 203 may be composed of the cathode material 202 and the doped surface region 208 may be composed of the cathode material 202 and the one or more dopants.

Referring now to FIG. 3, a TGA plot 300 depicts weight changes of pure, or undoped, NMC particles and a mixture of NMC particles and $Nd_2O_3$ particles during heating (as shown by curves 301 and 303, respectively). The TGA plot 300 may be utilized to determine an appropriate calcination temperature for a dry surface doping process, such as the dry surface doping process described above with references to FIGS. 1 and 2. As an example, a higher than typical dosage of $Nd_2O_3$ particles is mixed with NMC particles, such as a weight ratio of $Nd_2O_3$ particles to NMC particles of 33 wt. %, may be selected so as to clearly observe the respective weight change.

As shown by the curve 303, a slight weight loss in the pure NMC particles may occur at temperatures higher than 500° C. due to slight oxygen release. However, when the temperature exceeds 900° C., oxygen loss is more severe. As such, an upper threshold of 900° C. may be selected for the calcination temperature on the basis of this severe oxygen loss, as degradation of NMC may occur at temperatures higher than 900° C.

As shown by the curve 301, a significant weight loss in the mixture of the NMC particles and the $Nd_2O_3$ particles may occur in a temperature range of about 676.2° C. to about 711.8° C., which may indicate that a reaction of the NMC particles with the $Nd_2O_3$ particles is occurring. That is, an oxygen release from the $Nd_2O_3$ particles may occur as a result of reaction with the NMC particles in the temperature range of about 676.2° C. to about 711.8° C. As such, the appropriate temperature for calcination of NMC with $Nd_2O_3$ may be about 750° C.

Referring now to FIG. 4, SEM images 400 and 450 depict a mixture of $Nd_2O_3$ particles and NMC particles before and after calcination, respectively, in a dry surface doping process, such as the dry surface doping process described above with references to FIGS. 1 and 2. As such, the SEM image 400 depicts morphology of the mixture of $Nd_2O_3$ particles 401 and NMC particles 402 prior to calcination. As shown, the $Nd_2O_3$ particles 401 are uniformly distributed on the surface of the NMC particles 402. Further, the SEM image 450 depicts morphology of Nd-doped NMC particles 451 following calcination. As shown, the $Nd_2O_3$ particles 401 are no longer visible following calcination, indicating that the $Nd_2O_3$ particles 401 have fully, or substantially fully, reacted with the NMC particles 402 and Nd has thereby been doped into a lattice of the NMC particles 402.

Referring now to FIG. 5, a plot 500 depicts XRD patterns of undoped NMC, Nd-doped NMC, $Nd_2NiO_4$, and $Nd_2O_3$ (as shown by curves 501, 503, 504, and 505, respectively). In some examples, the Nd-doped NMC may be manufactured by a dry surface doping process, such as the dry surface doping process described above with references to FIGS. 1 and 2. As indicated by comparing the curve 505 to the curve 503, no, or substantially no, $Nd_2O_3$ is detected in the Nd-doped NMC. Such a lack of $Nd_2O_3$ in the Nd-doped NMC may indicate that $Nd_2O_3$ has fully, or substantially fully, reacted with NMC during the dry surface doping process. This is in contrast to other doping processes which result in doped cathode materials having a precursor present following a heating step (e.g., $LiCo_yO_z \cdot tMO_x$). However, a small amount of an impurity phase appears, as is indicated by comparing the curve 504 to the curve 503. That is, peak locations in the curve 503 may correspond well with a compound composed of Nd, Ni, and O, such as $Nd_2NiO_4$.

An inset 525 indicates a magnification area of a plot 550. The plot 550 depicts a peak shift 551 between the curve 501 and the curve 503. The peak that shifts 551 to the left may indicate that Nd is doped into the NMC lattice in the Nd-doped NMC, due to the relatively large ionic radius of $Nd^{3+}$ resulting in expansion of the c lattice parameter.

Referring now to FIGS. 6-11, to provide comparison to the dry surface doping process, a wet surface doping process may be employed to manufacture a Nd-doped NMC. In one example, the wet surface doping process includes dissolving a $Nd(NO_3)_3 \cdot 6H_2O$ salt in deionized (DI) water to form a solution, mixing NMC powder into the solution, and then stirring to achieve homogenization. Afterwards, the DI water may be evaporated by a rotary evaporator at 75° C. to obtain a dried mixture. The dried mixture may then be calcined in an oxygen atmosphere at a temperature of 750° C. for 4 h at a temperature ramping rate of 5° C./min. After natural cooling, the Nd-doped NMC may be obtained. The results of FIGS. 6-11 may be extendible to commercial Li-ion batteries, such as 42 Ah or 65 Ah batteries.

Referring now to FIGS. 6-8, various aspects of electrochemical performance of half coin cells including NMC, wet Nd-doped NMC (that is, Nd-doped NMC manufactured by a wet surface doping process, such as the wet surface doping process described hereinabove), or dry Nd-doped NMC (that is, Nd-doped NMC manufactured by a dry surface doping process, such as the dry surface doping process described above with reference to FIGS. 1 and 2) are characterized. To prepare a cathode, for half coin cell testing, 93 wt. % undoped NMC, wet Nd-doped NMC, or dry Nd-doped NMC, 4 wt. % carbon conductive additives (Denka), and 3 wt. % polyvinylidene fluoride (PVDF) binder (5% Kynar® HSV 900 PVDF in N-methyl-2-pyrrolidone solution) may be mixed in a Thinky mixer for 5 min at 2000 RPM three times. A resultant slurry may be cast on aluminum foil with a doctor blade, controlling active mass loading at 7 mg/cm². After drying the casted cathode in a vacuum over at 80° C. for 6 h, the casted electrode may be calendared to a density of 3.2 g/cm³ to obtain a final cathode. Type-2025 half coin cells may then be assembled with the final cathode, a lithium disk anode, a Celgard® 2500 membrane separator, and an electrolyte. The electrolyte may be 1 M $LiPF_6$ in a mixture of ethylene carbonate and ethyl methyl carbonate solvents, where a volume to volume ratio of the solvents is 1:2. The half coin cells may then be tested in at least a voltage range of 2.8 to 4.3 V.

Referring now to FIG. 6, plots 600 and 650 depict FCCs and FDCs, respectively, at 0.1 C (C=180 mA/g) rate in half coin cells including dry Nd-doped NMC, wet Nd-doped NMC, or undoped NMC samples. As shown in the plot 600, the FCC for the dry Nd-doped NMC sample is 203.5 mAh/g, the FCC for the wet Nd-doped NMC sample is 191.5 mAh/g, and the FCC for the undoped NMC sample is 199.1 mAh/g (as shown by plots 601, 602, and 603, respectively). As shown in the plot 650, the FDC for the dry Nd-doped NMC sample is 179.5 mAh/g, the FDC for the wet Nd-doped NMC sample is 170.6 mAh/g, and the FDC for the undoped NMC sample is 179.4 mAh/g (as shown by plots 651, 652, and 653, respectively). As such, the half coin cells including the dry Nd-doped NMC samples to the undoped NMC samples show similar FCCs and FDCs. As such, capacity retention may be maintained by dry Nd-doped NMC in half coin cells. However, the half coin cells including the wet Nd-doped NMC samples show drops in FCC and FDC as compared to the half coin cells including the dry Nd-doped NMC samples and the undoped NMC samples.

Referring now to FIG. 7, a plot 700 depicts a rate capability, in terms of specific discharge capacities for discharging rates of 0.1 C, 0.2 C, 0.5 C, 1 C, 2 C, and 5 C, in half coin cells including dry Nd-doped NMC, wet Nd-doped NMC, or undoped NMC samples. As shown in the plot 700, at 0.1 C, the specific discharge capacity for the dry Nd-doped NMC sample is 180.3 mAh/g, the specific discharge capacity for the wet Nd-doped NMC sample is 170.4 mAh/g, and the specific discharge capacity for the undoped NMC sample is 180.4 mAh/g (as shown by plots 701, 702, and 703, respectively). Further, at 0.2 C, the specific discharge capacity for the dry Nd-doped NMC sample is 178.4 mAh/g, the specific discharge capacity for the wet Nd-doped NMC sample is 168.5 mAh/g, and the specific discharge capacity for the undoped NMC sample is 175.9 mAh/g (as shown by plots 711, 712, and 713, respectively). Further, at 0.5 C, the specific discharge capacity for the dry Nd-doped NMC sample is 173.4 mAh/g, the specific discharge capacity for the wet Nd-doped NMC sample is 164.2 mAh/g, and the specific discharge capacity for the undoped NMC sample is 170.4 mAh/g (as shown by plots 721, 722, and 723, respectively). Further, at 1 C, the specific discharge capacity for the dry Nd-doped NMC sample is 168.9 mAh/g, the specific discharge capacity for the wet Nd-doped NMC sample is 160.1 mAh/g, and the specific discharge capacity for the undoped NMC sample is 165.5 mAh/g (as shown by plots 731, 732, and 733, respectively). Further, at 2 C, the specific discharge capacity for the dry Nd-doped NMC sample is 163.7 mAh/g, the specific discharge capacity for the wet Nd-doped NMC sample is 155.1 mAh/g, and the specific discharge capacity for the undoped NMC sample is 160.1 mAh/g (as shown by plots 741, 742, and 743, respectively). Further, at 5 C, the specific discharge capacity for the dry Nd-doped NMC sample is 154.7 mAh/g, the specific discharge capacity for the wet Nd-doped NMC sample is 146.4 mAh/g, and the specific discharge capacity for the undoped NMC sample is 149.5 mAh/g (as shown by plots 751, 752, and 753, respectively). As shown by the plot 700, the half coin cells including the dry Nd-doped NMC samples show higher specific discharge capacities at the discharging rates trend higher as compared to the half coin cells including the undoped NMC samples. Such improvement may be attributed to the larger c lattice parameter in the dry Nd-doped NMC samples, which may facilitate transport of lithium ions in and out of a layered structure of NMC. In contrast, the half coin cells including the wet Nd-doped NMC samples show drops in specific discharge capacities as compared to the half coin cells including the dry Nd-doped NMC samples and the undoped NMC samples at all discharging rates shown in the plot 700.

Referring now to FIG. 8, plots 800 and 850 depict capacity retentions and specific capacities, respectively, over averaged cycling of three half coin cells at a 0.5 C rate, each set of three half coin cells including dry Nd-doped NMC, wet Nd-doped NMC, or undoped NMC samples. In the plot 800, capacity retentions over averaged cycling of the half coin cells including the dry-doped NMC samples, the wet Nd-doped NMC samples, and the undoped NMC samples are shown by curves 801, 802, and 803, respectively. As shown in the plot 800, the half coin cells including the dry Nd-doped NMC sample have a higher capacity retention after 100 cycles (as shown by the curve 801) as compared the half coin cells including the wet Nd-doped NMC sample and the undoped NMC sample (as shown by the curves 802 and 803, respectively). Further, in the plot 850, specific capacities over averaged cycling of the half coin cells including the dry-doped NMC samples, the wet Nd-doped NMC samples, and the undoped NMC samples are shown by curves 851, 852, and 853, respectively. As shown in the plot 850, the half coin cells including the dry Nd-doped NMC samples have a higher specific capacity after 100 cycles (as shown by curve 851) as compared the half coin cells including the wet Nd-doped NMC sample and the undoped NMC sample (as shown by the curves 852 and 853, respectively). As such, dry surface doping of Nd may improve cycling performance of NMC in half coin cells. Notably, the half coin cells including the wet Nd-doped NMC samples have a lower specific capacity over the course of averaged cycling (as shown by the curve 852) as compared to the half coin cells including the undoped NMC samples (as shown by the curve 853).

Referring now to FIGS. 9-11, various aspects of electrochemical performance of SLP cells including NMC, wet Nd-doped NMC (that is, Nd-doped NMC manufactured by a wet surface doping process, such as the wet surface doping process described hereinabove), or dry Nd-doped NMC (that is, Nd-doped NMC manufactured by a dry surface doping process, such as the dry surface doping process described above with reference to FIGS. 1 and 2) are characterized. A cathode for SLP cell testing, may be composed of 94.5 wt. % undoped NMC, wet Nd-doped NMC, or dry Nd-doped NMC, 2.5 wt. % carbon conductive additives (2 wt. % Denka and 0.5 wt. % Engineering Carbon Products), and 3 wt. % PVDF binder (Solvay Solef® 5130). Further, an anode for the SLP cell testing may be composed of 94.5 wt. % graphite, 1 wt. % vapor grown carbon fibers, 1.5 wt. % carboxymethyl cellulose, and 0.5 wt. % styrene-butadiene rubber. An active mass loading for the cathode may be 19.80 g/cm$^2$ and an active mass loading for the anode may be 11 g/cm$^2$. The SLP cells may then be assembled with the cathode, the anode, a Celgard® 2500 membrane separator, and an electrolyte. The electrolyte may be 1 M LiPF$_6$ in a mixture of ethylene carbonate and ethyl methyl carbonate solvents, where a volume to volume ratio of the solvents is 1:2. The SLP cells may then be tested in at least a voltage range of 2.75 to 4.2 V.

Referring now to FIG. 9, plots 900 and 950 depict FCCs and FDCs, respectively, at 0.05 C (C=180 mA/g) rate in SLP cells including dry Nd-doped NMC, wet Nd-doped NMC, or undoped NMC samples. As shown in the plot 900, the FCC for the dry Nd-doped NMC sample is 196.8 mAh/g, the FCC for the wet Nd-doped NMC sample is 193.9 mAh/g, and the FCC for the undoped NMC sample is 199.1 mAh/g (as shown by plots 901, 902, and 903, respectively). As shown in the plot 950, the FDC for the dry Nd-doped NMC sample is 179.4 mAh/g, the FDC for the wet Nd-doped NMC sample is 176.9 mAh/g, and the FDC for the undoped NMC sample is 182.0 mAh/g (as shown by plots 951, 952, and 953, respectively). As such, the SLP cells including the dry Nd-doped NMC samples show slight drops in FCC and FDC as compared to the SLP cells including the undoped NMC samples. However, the SLP cells including the wet Nd-doped NMC samples show larger drops in FCC and FDC as compared to the SLP cells including the undoped NMC samples. As such, capacity retention may be better maintained by dry Nd-doped NMC in SLP cells.

Referring now to FIG. 10, plots 1000 and 1050 depict capacity retentions and specific discharge capacities, respectively, over averaged cycling of three SLP cells at a 1 C rate, each set of three SLP cells including dry Nd-doped NMC, wet Nd-doped NMC, or undoped NMC samples. In the plot 1000, capacity retentions over averaged cycling of the SLP cells including the dry-doped NMC samples, the wet Nd-doped NMC samples, and the undoped NMC samples are shown by curves 1001, 1002, and 1003, respectively. As shown in the plot 1000, the capacity retentions of the SLP cells including the dry Nd-doped NMC samples and the undoped NMC samples after 300 cycles are 87.1% and 74.7%, respectively. Further, in the plot 1050, specific capacities over averaged cycling of the SLP cells including the dry-doped NMC samples, the wet Nd-doped NMC samples, and the undoped NMC samples are shown by curves 1051, 1052, and 1053, respectively. As shown in the plot 1050, the specific capacities of the SLP cells including the dry Nd-doped NMC samples and the undoped NMC samples after 300 cycles are 138.3 mAh/g and 118.2 mAh/g, respectively. As such, dry surface doping of Nd may improve cycling performance of NMC in SLP cells. Notably, the SLP cells including the wet Nd-doped NMC samples have a lower capacity retention over the course of cycling (as shown by curve the 1002) as compared to the SLP cells including the dry Nd-doped NMC samples (as shown by curve the 1001). Further, the SLP cells including the wet Nd-doped NMC samples have a lower average specific capacity over the course of cycling (as shown by the curve 1052) as compared to the SLP cells including the dry Nd-doped NMC samples (as shown by the curve 1051).

Referring now to FIG. 11, a plot 1100 depicts DCR growths over averaged cycling of three SLP cells, each set of three SLP cells including dry Nd-doped NMC, wet Nd-doped NMC, or undoped NMC samples. In the plot 1100, DCR growths over averaged cycling of the SLP cells including the dry-doped NMC samples, the wet Nd-doped NMC samples, and the undoped NMC samples are shown for every 50 cycles by bars 1101, 1102, and 1103, respectively. As shown in the plot 1100, at 50 cycles, the DCR for the dry Nd-doped NMC sample is 1.45Ω, the DCR for the wet Nd-doped NMC sample is 1.40Ω, and the DCR for the undoped NMC sample is 1.43Ω. Further, at 100 cycles, the DCR for the dry Nd-doped NMC sample is 1.35Ω, the DCR for the wet Nd-doped NMC sample is 1.31Ω, and the DCR for the undoped NMC sample is 1.34Ω. Further, at 150 cycles, the DCR for the dry Nd-doped NMC sample is 1.33Ω, the DCR for the wet Nd-doped NMC sample is 1.37Ω, and the DCR for the undoped NMC sample is 1.36Ω. Further, at 200 cycles, the DCR for the dry Nd-doped NMC sample is 1.39Ω, the DCR for the wet Nd-doped NMC sample is 1.43Ω, and the DCR for the undoped NMC sample is 1.48Ω. Further, at 250 cycles, the DCR for the dry Nd-doped NMC sample is 1.43Ω, the DCR for the wet Nd-doped NMC sample is 1.47Ω, and the DCR for the undoped NMC sample is 1.55Ω. Further, at 300 cycles, the DCR for the dry Nd-doped NMC sample is 1.47Ω, the DCR for the wet Nd-doped NMC sample is 1.52Ω, and the DCR for the undoped NMC sample is 1.63Ω. Further, at 350 cycles, the DCR for the dry Nd-doped NMC sample is 1.52Ω, the DCR for the wet Nd-doped NMC sample is 1.55Ω, and the DCR for the undoped NMC sample is 1.68Ω. As such, the SLP cells including the dry Nd-doped NMC samples show slower DCR growth over averaged cycling (as shown by the bars 1101) than the SLP cells including the undoped NMC samples (as shown by the bars 1103). The reduced DCR growth when dry Nd-doped NMC samples are utilized is consistent with other results indicating improved electrochemical performance for said samples, as described above with reference to FIGS. 6-10. In comparison, the SLP cells including the wet Nd-doped NMC samples show faster DCR growth over averaged cycling (as shown by the bars 1102) than the SLP cells including the dry Nd-doped NMC samples (as shown by the bars 1101). The increased DCR growth when wet Nd-doped NMC samples are utilized is consistent with other results indicating worse electrochemical performance for said samples as compared to when dry Nd-doped NMC samples are utilized, as described above with reference to FIGS. 6-10.

Referring now to FIG. 12, cross-section SEM images 1200, 1210, and 1220 depict crack growth in undoped NMC particles after 300 cycles in a SLP cell at 2000×, 5000×, and 10000× magnification, respectively. Further, cross-section SEM images 1230, 1240, and 1250 depict crack growth in dry Nd-doped NMC particles after 300 cycles in a SLP cell at 2000×, 5000×, and 10000× magnification, respectively. The dry Nd-doped particles show fewer, smaller cracks (as most clearly shown by the cross-section SEM image 1250) as compared to the undoped NMC particles (as most clearly shown by the cross-section SEM image 1220), indicating increased crystal structural stability in the former. Specifically, the fewer, smaller cracks in the dry Nd-doped particles may be attributed to suppressed lattice volume change during cycling due to a presence of $Nd^{3+}$. Further, the fewer, smaller cracks may play an important role in improving cycling performance and reducing DCR growth rate in the SLP cells due to fewer side reactions occurring between an electrolyte and a cathode therein.

Referring now to FIG. 13, plots 1300 and 1350 depict changes in c lattice parameters determined via in situ XRD over initial cycling for half coin cells including the dry Nd-doped NMC sample and the undoped NMC sample. Specifically, curves 1301 and 1303 depict results for the half coin cells including the dry Nd-doped NMC sample and the undoped NMC sample, respectively, with respect to voltage during each of initial charging and discharging. In contrast, bars 1351 and 1353 depict results for the half coin cells including the dry Nd-doped NMC sample and the undoped NMC sample, respectively, with respect to voltage alone. Double-headed arrows 1361 and 1363 indicate differences in the c lattice parameters between 3.5 and 4 V of 0.280 Å for the dry Nd-doped NMC sample and 0.304 Å for the undoped NMC sample, respectively. As such, less change in the c lattice parameters are shown by the dry Nd-doped NMC sample as compared to the undoped NMC sample. A smaller change in the c lattice parameter may correspond to less expansion/contraction of a cathode lattice, which may contribute to fewer, smaller cracks. Thus, reduced change in the c lattice parameter when dry Nd-doped NMC samples are utilized is consistent with the fewer, smaller cracks in the dry Nd-doped NMC particles after cycling in a half coin cell, as described above with reference to FIG. 12. The results of FIG. 13 may be extendible to commercial Li-ion batteries, such as 42 Ah or 65 Ah batteries.

Referring now to FIG. 14, a plot 1400 depicts capacity retention over averaged cycling of three half coin cells at a 0.5 C rate, each set of three half coin cells including undoped NMC or dry Nd-doped NMC samples. Other results as described above with reference to FIGS. 4-13 are based on 1 wt. % Nd doping, which corresponds to 0.68 mol % Nd doping. To show that other Nd dosages may also be effective, cycling performance is shown in the plot 1400 for various molar ratios of Nd to NMC. Specifically, results for the half coin cells including the dry Nd-doped NMC sample including a molar ratio of Nd to NMC of 0.68 mol % are shown by a curve 1401. Further, results for the half coin cells including the dry Nd-doped NMC sample including a molar ratio of Nd to NMC of 0.4 mol % are shown by a curve 1402. It will be appreciated that the curve 1402 may be substantially overlapped in the plot 1400 by curves 1401, 1403, and 1404. Further, results for the half coin cells including the dry Nd-doped NMC sample including a molar ratio of Nd to NMC of 0.25 mol % are shown by the curve 1403. Further, results for the half coin cells including the dry Nd-doped NMC sample including a molar ratio of Nd to NMC of 0.15 mol % are shown by the curve 1404. Further, results for the half coin cells including the undoped NMC samples are shown by a curve 1405. As such, the plot 1400 indicates that half coin cells including NMC samples dry surface doped with 0.25 mol % Nd show higher capacity retention than the half coin cells including the undoped NMC samples and each of the other dry Nd-doped NMC samples shown (as indicated by comparing the curve 1403 to the curves 1405, 1401, 1402, and 1404). Thus, an optimum value with respect to capacity retention (and thereby cycling stability) for the molar ratio of Nd to NMC in a dry surface doping process, such as the dry surface doping process described above with reference to FIGS. 1-2, may be determined. The results of FIG. 14 may be extendible to commercial Li-ion batteries, such as 42 Ah or 65 Ah batteries.

Referring now to FIG. 15, a plot 1500 depicts specific capacities over averaged cycling of three half coin cells at a 0.5 C rate, each set of three half coin cells including undoped NMC samples or NMC samples dry surface doped with 0.25 mol % Nd. Other results as described above with reference to FIGS. 4-14 are based on doping with dopant precursor particles having a size of 80 to 140 nm, where the dopant precursor particles may be composed of $Nd_2O_3$. To show that other sizes of the dopant precursor particles may also be effective, cycling performance is shown in the plot 1500 for two sizes of the dopant precursor particles. Specifically, results for the half coin cells including NMC samples dry surface doped with dopant precursor particles having a smaller size of 80 to 140 nm are shown by a curve 1551. Further, results for the half coin cells including NMC samples dry surface doped with dopant precursor particles having a larger size of 660 to 720 nm are shown by a curve 1552. Further, results for the half coin cells including undoped NMC samples are shown by a curve 1553. As such, the plot 1500 indicates that the half coin cells including the NMC samples dry surface doped with the larger sized dopant precursor particles may show substantially similar specific capacities (and thereby cycling performance) to the NMC samples dry surface doped with the smaller size dopant precursor particles (as indicated by comparing the curve 1552 to the curve 1551). Further, each of the half coin cells including dry Nd-doped NMC samples show higher specific capacities (and thereby cycling performance) than the half coin cells including the undoped NMC samples (as indicated by comparing the curves 1551 and 1552 to the curve 1553). The results of FIG. 15 may be extendible to commercial Li-ion batteries, such as 42 Ah or 65 Ah batteries.

In this way, a cathode material may be doped with one or more metal dopants having a large ionic radius (e.g., greater than about 0.50 Å) in a dry surface doping process. The dry surface doping process may dope the one or more metal dopants into a surface of the cathode material. The technical effect of employing such a dry surface doping process is that the cathode material may avoid contact with solvents, preventing possible damage of the cathode material surface. Further, the dry surface doping process may restrict degradation in cycling performance and capacity retention ascribed to electrochemically inactive metal dopant(s). As such, a crystal structure of the cathode material may be stabilized, suppressing crack formation/growth, and thereby reducing a portion of the cathode material surface exposed to an electrolyte in a battery. As such, fewer side reactions between the electrolyte and the cathode material may occur, limiting capacity degradation. Further, increased structural stability of the cathode material crystal structure may improve capacity retention during cycling in the battery. As a result, issues such as poor cycling performance, fast DCR growth, and crack formation/growth in commercial Li-ion batteries may be mitigated.

In one example, a method comprises dry mixing NMC and dopant precursor particles to obtain a pre-calcination mixture, and calcining the pre-calcination mixture in a dry calcination atmosphere to obtain a doped cathode material, wherein the dopant precursor particles comprise one or more alkali metal oxides, alkali metal hydroxides, alkaline earth metal oxides, alkaline earth metal hydroxides, rare earth oxides, rare earth hydroxides, transition metal oxides, and transition metal hydroxides. A first example of the method further includes wherein the dry calcination atmosphere is dry air or a dry oxygen atmosphere. A second example of the method, optionally including the first example of the method, further includes wherein following the dry mixing, the dopant precursor particles are uniformly distributed on a surface of the NMC. A third example of the method, optionally including one or more of the first and second examples of the method, further includes wherein following the dry mixing, the dopant precursor particles protrude from the surface of the NMC at a distance of 0 to 10 μm. A fourth example of the method, optionally including one or more of the first through third examples of the method, further includes wherein a temperature of the calcining is less than 950° C. A fifth example of the method, optionally including one or more of the first through fourth examples of the method, further includes wherein the doped cathode material comprises a dopant, the dopant comprising one or more of B, N, F, Na, Si, Cl, K, Ca, Ga, Ru, Ta, W, Co, Al, Zr, Mg, Sc, Fe, V, Nb, Cu, Zn, Rh, Y, Ti, Mo, Cr, Mn, Ce, Sm, Nd, Pr, La, Ge, Rb, Sr, In, Eu, and Tb. A sixth example of the method, optionally including one or more of the first through fifth examples of the method, further includes wherein a size of the dopant precursor particles is greater than about 1 nm and less than about 10 μm. A seventh example of the method, optionally including one or more of the first through sixth examples of the method, further includes wherein the size of the dopant precursor particles is greater than about 5 nm and less than about 5 μm. An eighth example of the method, optionally including one or more of the first through seventh examples of the method, further includes wherein a molar ratio of the dopant to the NMC in the doped cathode material is greater than about 0.01 mol % and less than about 15 mol %. A ninth example of the method, optionally including one or more of the first through eighth examples of the method, further includes wherein the dopant precursor particles comprise one or more compounds selected from neodymium oxides, neodymium acetates, neodymium nitrides, neodymium sulfates, neodymium fluoride, neodymium nitrate, neodymium phosphide, neodymium sulfide, neodymium iodide, neodymium phosphate, neodymium carbonate, neodymium oxalate, neodymium acetylacetonate, and combinations thereof. A tenth example of the method, optionally including one or more of the first through ninth examples of the method, further includes wherein the dopant precursor particles comprise $Nd_2O_3$.

In another example, a doped cathode material comprises a core region, the core region being composed of NMC, and a surface region, the surface region being composed of NMC and a metal dopant, wherein the metal dopant is a metal ion having an ionic radius of greater than about 0.50 Å. A first example of the doped cathode material further includes wherein a molar ratio of the metal dopant to the NMC is greater than about 0.01 mol % and less than about 15 mol %. A second example of the doped cathode material, optionally including the first example of the doped cathode material, further includes wherein the surface region extends to a threshold depth of a radius of the doped cathode material.

In yet another example, a doped cathode material comprises NMC, and a dopant comprising one or more of B, N, F, Na, Si, Cl, K, Ca, Ga, Ru, Ta, W, Co, Al, Zr, Mg, Sc, Fe, V, Nb, Cu, Zn, Rh, Y, Ti, Mo, Cr, Mn, Ce, Sm, Nd, Pr, La, Ge, Rb, Sr, In, Eu, and Tb, wherein the dopant is uniformly doped into a surface region of the NMC in a dry surface doping process, wherein the dry surface doping process comprises a dopant precursor being mixed and calcined with the NMC, and wherein the dopant precursor is not present following the dry surface doping process. A first example of the doped cathode material further includes wherein a weight ratio of the dopant to the NMC is less than about 15 wt. %. A second example of the doped cathode material, optionally including the first example of the doped cathode material, further includes wherein the dopant precursor comprises one or more compounds selected from dopant oxides, dopant acetates, dopant nitrides, dopant sulfates, dopant fluoride, dopant nitrate, dopant phosphide, dopant sulfide, dopant iodide, dopant phosphate, dopant carbonate, dopant oxalate, dopant acetylacetonate, and combinations thereof. A third example of the doped cathode material, optionally including one or more of the first and second examples of the doped cathode material, further includes wherein the dopant precursor comprises one or more compounds selected from neodymium oxides, neodymium acetates, neodymium nitrides, neodymium sulfates, neodymium fluoride, neodymium nitrate, neodymium phosphide, neodymium sulfide, neodymium iodide, neodymium phosphate, neodymium carbonate, neodymium oxalate, neodymium acetylacetonate, and combinations thereof. A fourth example of the doped cathode material, optionally including one or more of the first through third examples of the doped cathode material, further includes wherein the dopant precursor is $Nd_2O_3$. A fifth example of the doped cathode material, optionally including one or more of the first through fourth examples of the doped cathode material, further includes wherein the dopant is a metal ion having an ionic radius of greater than about 0.50 Å.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    selecting lithium nickel manganese cobalt oxide particles, wherein the lithium nickel manganese cobalt oxide particles include openings within a surface region of the lithium nickel manganese cobalt oxide particles;
    selecting complimentary sized dopant precursor particles, wherein a size of the dopant particles is such that the dopant precursor particles are retained in and adhere to the opening upon dry mixing;
    dry mixing lithium nickel manganese cobalt oxide particles and dopant precursor particles to obtain a pre-calcination mixture; and
    calcining the pre-calcination mixture in a dry calcination atmosphere to obtain a doped cathode material,
    wherein the dopant precursor particles comprise one or more compounds selected from neodymium oxides, neodymium acetates, neodymium nitrides, neodymium sulfates, neodymium fluoride, neodymium nitrate, neodymium phosphide, neodymium sulfide, neodymium iodide, neodymium phosphate, neodymium carbonate, neodymium oxalate, neodymium acetylacetonate, and combinations thereof.

2. The method of claim 1, wherein the dry calcination atmosphere is dry air or a dry oxygen atmosphere.

3. The method of claim 1, wherein following the dry mixing, the dopant precursor particles are uniformly distributed on a surface of the lithium nickel manganese cobalt oxide particles.

4. The method of claim 3, wherein following the dry mixing, the dopant precursor particles protrude from the surface of the lithium nickel manganese cobalt oxide particles at a distance of 0 to 10 μm.

5. The method of claim 1, wherein a temperature of the calcining is less than 950° C.

6. The method of claim 1, wherein the doped cathode material comprises a dopant, the dopant comprising one or more of B, N, F, Na, Si, Cl, K, Ca, Ga, Ru, Ta, W, Co, Al, Zr, Mg, Sc, Fe, V, Nb, Cu, Zn, Rh, Y, Ti, Mo, Cr, Mn, Ce, Sm, Nd, Pr, La, Ge, Rb, Sr, In, Eu, and Tb.

7. The method of claim 1, wherein a size of the dopant precursor particles is greater than about 1 nm and less than about 10 μm.

8. The method of claim 1, wherein the size of the dopant precursor particles is greater than about 5 nm and less than about 5 μm.

9. The method of claim 1, wherein a molar ratio of the dopant to the lithium nickel manganese cobalt oxide particles in the doped cathode material is greater than about 0.01 mol % and less than about 15 mol %.

10. The method of claim 1, wherein the dopant precursor particles comprise $Nd_2O_3$.

11. A doped cathode material, comprising:
    a core region, the core region being composed of lithium nickel manganese cobalt oxide; and
    a doped surface region, the doped surface region being composed of lithium nickel manganese cobalt oxide and a metal dopant and formed from metal dopant precursor particles,
    wherein the metal dopant is a metal ion having an ionic radius of greater than about 0.50 Å, and wherein the metal dopant precursor particle is comprised of one or more compounds selected from neodymium oxides, neodymium acetates, neodymium nitrides, neodymium sulfates, neodymium fluoride, neodymium nitrate, neodymium phosphide, neodymium sulfide, neodymium iodide, neodymium phosphate, neodymium carbonate, neodymium oxalate, neodymium acetylacetonate, and combinations thereof.

12. The doped cathode material of claim 11, wherein a molar ratio of the metal dopant to the lithium nickel manganese cobalt oxide is greater than about 0.01 mol % and less than about 15 mol %.

13. The doped cathode material of claim 11, wherein the doped surface region extends to a threshold depth of a radius of the doped cathode material.

14. A doped cathode material, comprising:
    lithium nickel manganese cobalt oxide; and
    a dopant comprising B and Nd, wherein the dopant is uniformly doped within a surface region of the lithium nickel manganese cobalt oxide in a dry surface doping process, wherein dopant precursor particles are sized complimentary to openings within a surface region of the lithium nickel manganese cobalt oxide, and
    wherein a dopant precursor is not present in the doped surface region, and wherein the dopant precursor comprises one or more compounds selected from neodymium oxides, neodymium acetates, neodymium nitrides, neodymium sulfates, neodymium fluoride, neodymium nitrate, neodymium phosphide, neodymium sulfide, neodymium iodide, neodymium phosphate, neodymium carbonate, neodymium oxalate, neodymium acetylacetonate, and combinations thereof, and the doped surface region includes lithium nickel manganese cobalt oxide and the dopant.

15. The doped cathode material of claim 14, wherein a weight ratio of the dopant to the lithium nickel manganese cobalt oxide is less than about 15 wt. %.

16. The doped cathode material of claim 14, wherein the dopant precursor is $Nd_2O_3$.

17. The doped cathode material of claim 14, wherein the dopant is a metal ion having an ionic radius of greater than about 0.50 Å.

* * * * *